(12) United States Patent
Taylor

(10) Patent No.: US 9,811,544 B1
(45) Date of Patent: *Nov. 7, 2017

(54) MANAGEMENT OF REAL-TIME AND HISTORICAL STREAMING DATA

(71) Applicant: SAS Institute Inc., Cary, NC (US)

(72) Inventor: Katherine Fullington Taylor, Raleigh, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/345,091

(22) Filed: Nov. 7, 2016

Related U.S. Application Data

(63) Continuation of application No. 15/344,868, filed on Nov. 7, 2016.

(60) Provisional application No. 62/359,415, filed on Jul. 7, 2016, provisional application No. 62/371,824, filed on Aug. 7, 2016.

(51) Int. Cl.
  *G06F 7/00* (2006.01)
  *G06F 17/00* (2006.01)
  *G06F 17/30* (2006.01)

(52) U.S. Cl.
  CPC .. *G06F 17/30309* (2013.01); *G06F 17/30365* (2013.01); *G06F 17/30551* (2013.01)

(58) Field of Classification Search
  None
  See application file for complete search history.

(56) References Cited

U.S. PATENT DOCUMENTS

| 8,521,692 | B1 * | 8/2013 | Ogata | G06F 11/1453 707/614 |
| 2004/0143609 | A1 * | 7/2004 | Gardner | G06F 17/30067 |
| 2008/0034307 | A1 * | 2/2008 | Cisler | G06F 9/4443 715/764 |
| 2009/0182779 | A1 | 7/2009 | Johnson | |

(Continued)

OTHER PUBLICATIONS

Amazon Web Services, Inc. "Amazon Kinesis" retrieved from https://amazon.com/kinesis/?nc2=h_m1 on Jul. 27, 2016, 6 pages.

(Continued)

*Primary Examiner* — Tuan A Pham
(74) *Attorney, Agent, or Firm* — Kilpatrick Townsend & Stockton LLP

(57) ABSTRACT

Real-time and historical data can be managed. For example, a processing engine can be selectively operated in a historical mode. In the historical mode, the processing engine can analyze data associated with a previous date. For example, the processing device can access a database that includes multiple entries. Each entry in the database can be associated with a respective record and including (i) an entity associated with the respective record, (ii) an identifier of a block of records that comprises the respective record, and (iii) a timestamp indicating when the block of records was generated. The processing engine can filter entries in the database to determine blocks of records that include a most current record for each entity as of the previous date. The processing engine can process the blocks of records to determine an output corresponding to the previous date.

30 Claims, 18 Drawing Sheets

(56) References Cited

U.S. PATENT DOCUMENTS

2014/0173177 A1     6/2014    Benhase et al.
2015/0370838 A1    12/2015    Paradies et al.

OTHER PUBLICATIONS

IBM Software Products Analytics business solutions Risk Management "Algo Risk" retrieved from http://www-03.ibm.com/software/products/en/algorisk on Jul. 27, 2016, 2 pages.
Lipcon et al., "Kudu: Storage for Fast Analytics on Fast Data" Cloudera, Inc. kudu.apache.org/kudu.pdf (Sep. 2015) 13 pages.
Non-Final Office Action for U.S. Appl. No. 15/344,868, dated Jun. 15, 2017, 17 pages.
Achari, Shiva, "Hadoop Essentials," Apr. 29, 2015, 2 pages.
Shyam, R., et al., "Apache Spark a Big Data Analytics Platform for Smart Grid," Aug. 6-8, 2015, pp. 171-178.
Liu, Xiufeng, "Streamlining Smart Meter Data Analytics, Aug. 10, 2015," 15 pages.

\* cited by examiner

| entityID | groupNAME | GroupTime | event |
|---|---|---|---|
| A | Day1_Group1 | Day1_0801 | Create |
| B | Day1_Group1 | Day1_0801 | Create |
| C | Day1_Group1 | Day1_0801 | Create |
| C | Day2_Group1 | Day2_0802 | Update |
| D | Day1_Group2 | Day1_0804 | Create |
| D | Day2_Group1 | Day2_0802 | Update |
| E | Day1_Group2 | Day2_0802 | Create |
| E | Day2_Group1 | Day2_0802 | Update |
| F | Day1_Group2 | Day1_0804 | Create |
| F | NA | Day2_0802 | Cancel |
| G | Day1_Group3 | Day1_0810 | Create |
| H | Day1_Group3 | Day1_0810 | Create |
| ... | ... | ... | ... |
| L | Day1_Group4 | Day1_0835 | Create |

FIG. 16

MANAGEMENT OF REAL-TIME AND HISTORICAL STREAMING DATA

REFERENCE TO RELATED APPLICATION

This is a continuation of and claims the benefit of priority under 35 U.S.C. §120 to U.S. patent application Ser. No. 15/344,868, titled "Management of Streaming Data" and filed on Nov. 7, 2016, which claims the benefit of priority under 35 U.S.C. §119(e) to U.S. Provisional Patent Application No. 62/359,415, titled "Management of Real-Time Streaming Data" and filed Jul. 7, 2016, and the benefit of priority under 35 U.S.C. §119(e) to U.S. Provisional Patent Application No. 62/371,824, titled "Management of Real-Time Streaming Data" and filed Aug. 7, 2016, the entirety of each of which is hereby incorporated by reference herein.

TECHNICAL FIELD

The present disclosure relates generally to computer-to-computer data streaming. More specifically, but not by way of limitation, this disclosure relates to management of real-time and historical streaming data.

BACKGROUND

Data can be streamed from one electronic device to another. Streaming can include transmitting or communicating data in a substantially continuous flow between the electronic devices. Some electronic devices can receive streaming data and analyze the streaming data in substantially real time (e.g., within a very short time-period after receiving the streaming data, such as 50 milliseconds or less).

SUMMARY

In one example, a non-transitory computer readable medium comprising program code executable by a processor is provided. The program code can cause the processor to receive a request for causing a processing engine to operate in a historical mode in which the processing engine analyzes data associated with a previous date that is at least one day prior to a current date. The program code can cause the processor to perform one or more steps based on receiving the request. For example, the program code can cause the processor to access a database that includes a plurality of entries. Each entry in the database can be associated with a respective record and including (i) an entity associated with the respective record, (ii) an identifier of a block of records that comprises the respective record, and (iii) a timestamp indicating when the block of records was generated. The program code can cause the processor to filter entries in the database based on the timestamp to determine blocks of records that include a most current record for each entity as of the previous date. The program code can cause the processor to use the processing engine to process the blocks of records to determine an output corresponding to the previous date.

In another example, a method is provided that can include receiving, by a processor, a request for causing a processing engine to operate in a historical mode in which the processing engine analyzes data associated with a previous date that is at least one day prior to a current date. The method can include performing one or more steps based on receiving the request. For example, the method can include accessing, by the processor, a database that includes a plurality of entries. Each entry in the database can be associated with a respective record and including (i) an entity associated with the respective record, (ii) an identifier of a block of records that comprises the respective record, and (iii) a timestamp indicating when the block of records was generated. The method can include filtering, by the processor, entries in the database based on the timestamp to determine blocks of records that include a most current record for each entity as of the previous date. The method can include using, by the processor, the processing engine to process the blocks of records to determine an output corresponding to the previous date.

In another example, a system is provided that can include a processing device and a memory device. The memory device can include instructions executable by the processing device. The instructions can cause the processing device to receive a request for causing a processing engine to operate in a historical mode in which the processing engine analyzes data associated with a previous date that is at least one day prior to a current date. The instructions can cause the processing device to perform one or more steps based on receiving the request. For example, the instructions can cause the processing device to access a database that includes a plurality of entries. Each entry in the database can be associated with a respective record and including (i) an entity associated with the respective record, (ii) an identifier of a block of records that comprises the respective record, and (iii) a timestamp indicating when the block of records was generated. The instructions can cause the processing device to filter entries in the database based on the timestamp to determine blocks of records that include a most current record for each entity as of the previous date. The instructions can cause the processing device to use the processing engine to process the blocks of records to determine an output corresponding to the previous date.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures:

FIG. 16 is a table of an example of entities mapped to a group and an event according to some aspects.

Figure 1:
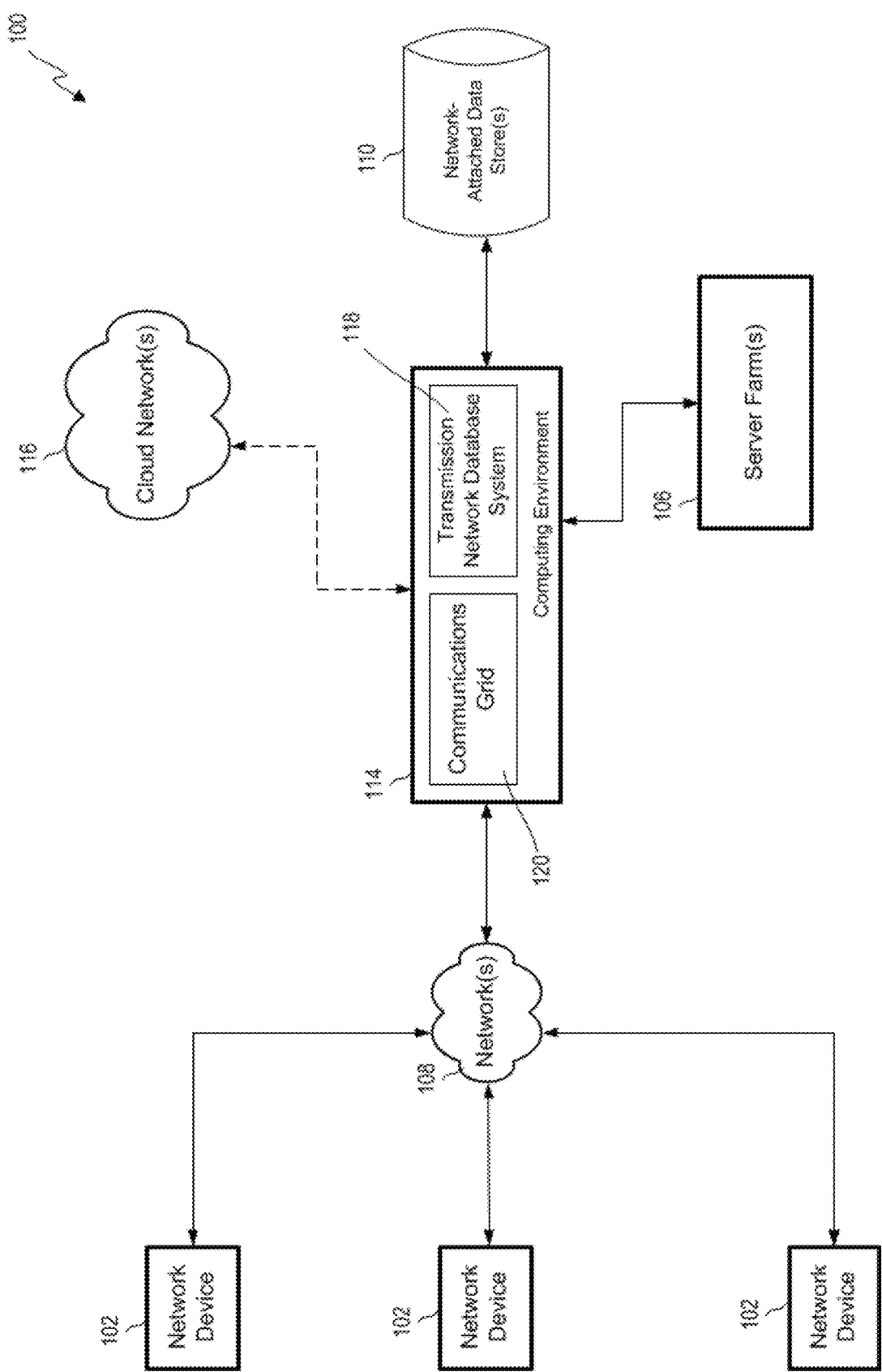
FIG. 1 is a block diagram of an example of the hardware components of a computing system according to some aspects.

In the appended figures, similar components or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of examples of the technology. But various examples can be practiced without these specific details. The figures and description are not intended to be restrictive.

The ensuing description provides examples only, and is not intended to limit the scope, applicability, or configuration of the disclosure. Rather, the ensuing description of the examples provides those skilled in the art with an enabling description for implementing an example. Various changes may be made in the function and arrangement of elements without departing from the spirit and scope of the technology as set forth in the appended claims.

Specific details are given in the following description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples can be described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. A process is terminated when its operations are completed, but can have additional operations not included in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

Certain aspects and features of the present disclosure relate to a batch-processing engine that can receive updates to existing records and, in substantially real time (e.g., within a very short time-period after receiving the updates, such as 50 milliseconds), process the most current version of each record. A batch-processing engine can be a software application that aggregates and analyzes data in groups, which can be referred to as a batch or a batch of data. A record can include information that is associated with an entity (e.g., a person, a house, a business, a building, an electrical device, etc.). An example of a record can include an amount of water used by a house on a particular day. In some examples, the batch-processing engine can also preserve all prior versions of the records (along with information about each record), so that the batch-processing engine can analyze the most current version of each record as of a previous date.

Batch-processing engines can store and access data in groups. For example, a batch-processing engine can store multiple records (e.g., five records) in a single file. The batch-processing engine may store multiple records in a single file, rather than storing each record individually in a separate file, because storing each record individually may be unfeasible when there are a high number (e.g., millions) of records. And the batch-processing engine may access all the records in the file together as a group to perform an analysis. But storing and accessing data in groups can make updating a single record challenging. For example, the batch-processing engine may receive an update for a record. To update the record, the batch-processing engine can access a file that contains the record. But while the batch-processing engine accesses the file and attempts to update the record, the batch-processing engine may also undergo a locking period. During the locking period, the batch-processing engine may be blocked from accessing the other data in the file while the batch-processing engine updates the record. If records are frequently (and randomly) updated, multiple files may have to be updated simultaneously, and the resulting locking periods can inhibit real-time analysis of records. As another example, to update the record without introducing a locking period, the batch-processing engine may create a copy of the file that contains the record. The batch-processing engine can then update the copy of the file with the new information for the record. But this process can be slow, result in multiple copies of the same data (e.g., some or all of the data stored in the original file that contained the original version of the record), and use a large amount of computing resources.

Also, it may be desirable to have a batch-processing engine analyze only the most current versions of the records to provide real-time analytics and insight. This may require old or out-of-date records to be excluded from the analysis. But because batch-processing engines store and access data in groups, it can be challenging to exclude out-of-date records from the analysis. For example, a batch-processing engine may access multiple files for performing an analysis. And each file may contain both current and out-of-date records. Because the batch-processing engine may indiscriminately use all of the data in all of the files for the analysis, the batch-processing engine may incorporate the out-of-date records into the analysis. It can be challenging to ensure that the batch-processing engine only uses the most current versions of the records in an analysis.

Some examples of the present disclosure overcome one or more of the above issues by storing the updated records in new files, rather than updating existing files. The existing files can remain unchanged. This may prevent existing data from being overwritten, and may reduce or eliminate the locking period, enabling the batch-processing engine to perform real-time analysis of streaming data. Storing the updated records in new files may also reduce or eliminate duplication of record data. Also, by storing the updated records in new files, rather than updating existing files, the batch-processing engine can maintain a full history of the records. The batch-processing engine can then be pointed back to a prior point in time and analyze the records as they were at that point in time. Further, by storing the updated records in new files, rather than updating existing files, the batch-processing engine can be executed within computing environments (e.g., a Hadoop environment) that do not allow existing files to be updated.

Further, some examples of the present disclosure overcome one or more of the above issues by maintaining a table or database that indicates which versions of the records are most current, which files have the most current versions of the records, or both of these. This can enable the batch-processing engine to analyze only the most current versions of the records.

FIGS. 1-10 depict examples of systems and methods usable for managing streaming data according to some aspects. For example, FIG. 1 is a block diagram of an example of the hardware components of a computing system according to some aspects. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100. The computing environment 114 may include one or more other systems. For example, computing environment 114 may include a database system 118 or a communications grid 120. The data transmission network 100 can include one or more processors (e.g., distributed over one or more networks or otherwise in communication with one another) that, in some examples, can collectively be referred to as a processor.

Data transmission network 100 also includes one or more network devices 102. Network devices 102 may include client devices that can communicate with computing environment 114. For example, network devices 102 may send data to the computing environment 114 to be processed, may send communications to the computing environment 114 to control different aspects of the computing environment or the data it is processing, among other reasons. Network devices 102 may interact with the computing environment 114 through a number of ways, such as, for example, over one or more networks 108.

In some examples, network devices 102 may provide a large amount of data, either all at once or streaming over a period of time (e.g., using event stream processing (ESP)), to the computing environment 114 via networks 108. For example, the network devices 102 can transmit electronic messages, all at once or streaming over a period of time, to the computing environment 114 via networks 108.

The network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices 102 themselves. Network devices 102 may also include sensors that monitor their environment or other devices to collect data regarding that environment or those devices, and such network devices 102 may provide data they collect over time. Network devices 102 may also include devices within the internet of things, such as devices within a home automation network. Some of these devices may be referred to as edge devices, and may involve edge-computing circuitry. Data may be transmitted by network devices 102 directly to computing environment 114 or to network-attached data stores, such as network-attached data stores 110 for storage so that the data may be retrieved later by the computing environment 114 or other portions of data transmission network 100. For example, the network devices 102 can transmit data usable for managing streaming data to a network-attached data store 110 for storage. The computing environment 114 may later retrieve the data from the network-attached data store 110 and use the data to manage streaming data.

Network-attached data stores 110 can store data to be processed by the computing environment 114 as well as any intermediate or final data generated by the computing system in non-volatile memory. But in certain examples, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated dynamically (e.g., on the fly). In this situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data stores may include storage other than primary storage located within computing environment 114 that is directly accessible by processors located therein. Network-attached data stores may include secondary, tertiary or auxiliary storage, such as large hard drives, servers, virtual memory, among other types. Storage devices may include portable or non-portable storage devices, optical storage devices, and various other mediums capable of storing, containing data. A machine-readable storage medium or computer-readable storage medium may include a non-transitory medium in which data can be stored and that does not include carrier waves or transitory electronic communications. Examples of a non-transitory medium may include, for example, a magnetic disk or tape, optical storage media such as compact disk or digital versatile disk, flash memory, memory or memory devices. A computer-program product may include code or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others. Furthermore, the data stores may hold a variety of different types of data. For example, network-attached data stores 110 may hold unstructured (e.g., raw) data.

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time-stamped data may be aggregated by time (e.g., into daily time period units) to generate time series data or structured hierarchically according to one or more dimensions (e.g., parameters, attributes, or variables). For example, data may be stored in a hierarchical data structure, such as a relational online analytical processing (ROLAP) or multidimensional online analytical processing (MOLAP) database, or may be stored in another tabular form, such as in a flat-hierarchy form.

Data transmission network 100 may also include one or more server farms 106. Computing environment 114 may route select communications or data to the sever farms 106 or one or more servers within the server farms 106. Server farms 106 can be configured to provide information in a predetermined manner. For example, server farms 106 may access data to transmit in response to a communication. Server farms 106 may be separately housed from each other device within data transmission network 100, such as computing environment 114, or may be part of a device or system.

Server farms 106 may host a variety of different types of data processing as part of data transmission network 100. Server farms 106 may receive a variety of different data from network devices, from computing environment 114, from cloud network 116, or from other sources. The data may have been obtained or collected from one or more websites, sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain examples, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network 116 can dynamically scale to meet the needs of its users. The cloud network 116 may include one or more computers, servers, or systems. In some examples, the computers, servers, or systems that make up the cloud network 116 are different from the user's own on-premises computers, servers, or systems. For example, the cloud network 116 may host an application, and a user may, via a communication network such as the Internet, order and use the application on demand. In some examples, the cloud network 116 may host an application for managing streaming data.

While each device, server, and system in FIG. 1 is shown as a single device, multiple devices may instead be used. For example, a set of network devices can be used to transmit various communications from a single user, or remote server 140 may include a server stack. As another example, data may be processed as part of computing environment 114.

Each communication within data transmission network 100 (e.g., between client devices, between a device and connection management system 150, between server farms 106 and computing environment 114, or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a Bluetooth or a Bluetooth Low Energy channel. A wired network may include a wired interface. The wired or wireless networks may be implemented using routers, access points, bridges, gateways, or the like, to connect devices in the network 108. The networks 108 can be incorporated entirely within or can include an intranet, an extranet, or a combination thereof. In one example, communications between two or more systems or devices can be achieved by a secure communications protocol, such as secure sockets layer (SSL) or transport layer security (TLS). In addition, data or transactional details may be encrypted.

Some aspects may utilize the Internet of Things (IoT), where things (e.g., machines, devices, phones, sensors) can be connected to networks and the data from these things can be collected and processed within the things or external to the things. For example, the IoT can include sensors in many different devices, and high value analytics can be applied to identify hidden relationships and drive increased efficiencies. This can apply to both big data analytics and real-time (e.g., ESP) analytics.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The computing nodes in the communications grid 120 and the transmission network database system 118 may share the same processor hardware, such as processors that are located within computing environment 114.

In some examples, the computing environment 114, a network device 102, or both can implement one or more processes for managing streaming data. For example, the computing environment 114, a network device 102, or both can implement one or more versions of the processes discussed with respect to FIGS. 11, 17, and 18.

Figure 2:
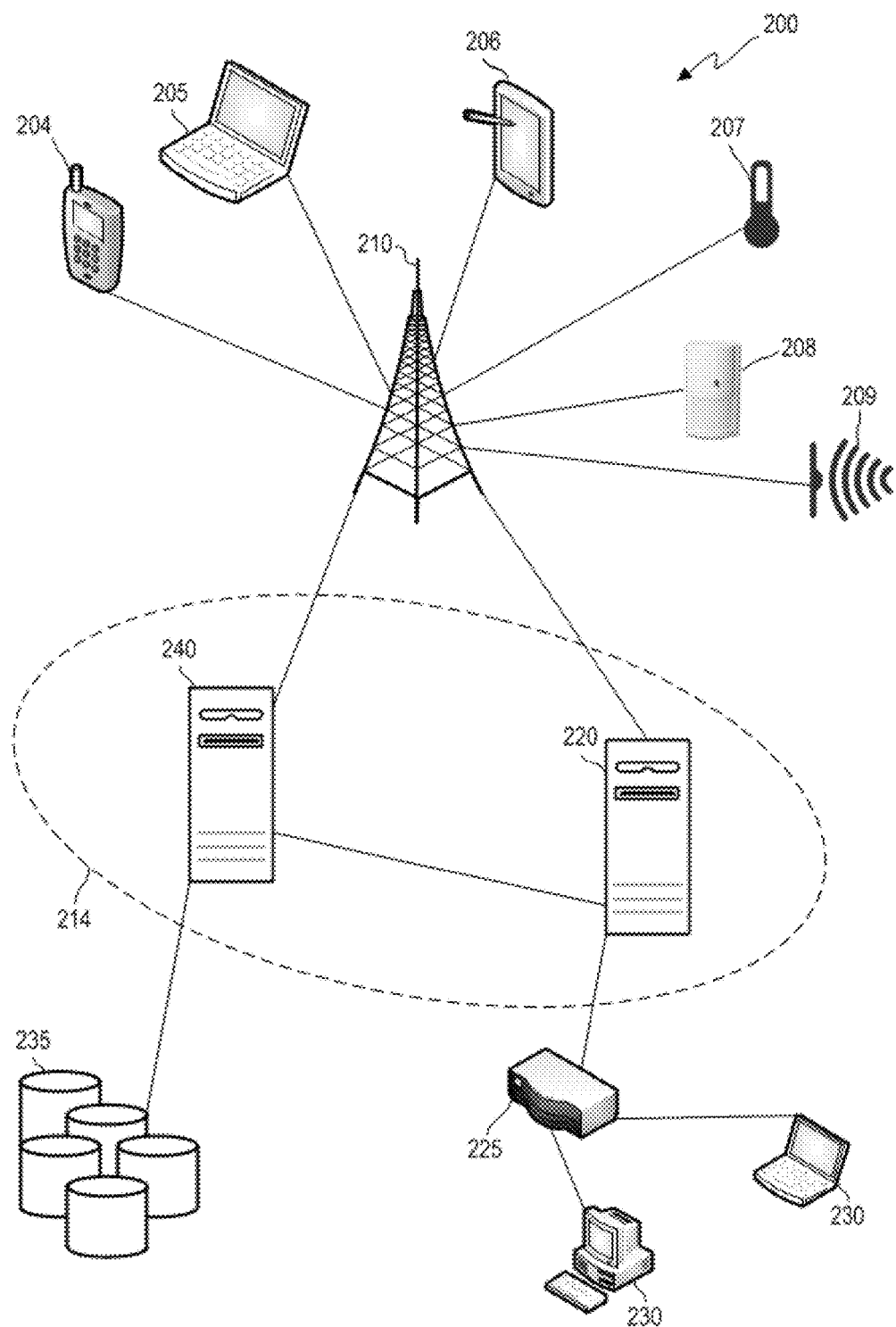
FIG. 2 is an example of devices that can communicate with each other over an exchange system and via a network according to some aspects.

FIG. 2 is an example of devices that can communicate with each other over an exchange system and via a network according to some aspects. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station 210). In some examples, the communication can include times series data. The communication can be routed to another network device, such as network devices 205-209, via base station 210. The communication can also be routed to computing environment 214 via base station 210. In some examples, the network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting aspects of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems. The network devices may detect and record data related to the environment that it monitors, and transmit that data to computing environment 214.

The network devices 204-209 may also perform processing on data it collects before transmitting the data to the computing environment 214, or before deciding whether to transmit data to the computing environment 214. For example, network devices 204-209 may determine whether data collected meets certain rules, for example by comparing data or values calculated from the data and comparing that data to one or more thresholds. The network devices 204-209 may use this data or comparisons to determine if the data is to be transmitted to the computing environment 214 for further use or processing. In some examples, the network devices 204-209 can pre-process the data prior to transmitting the data to the computing environment 214. For example, the network devices 204-209 can reformat the data before transmitting the data to the computing environment 214 for further processing.

Computing environment 214 may include machines 220, 240. Although computing environment 214 is shown in FIG. 2 as having two machines 220, 240, computing environment 214 may have only one machine or may have more than two machines. The machines 220, 240 that make up computing environment 214 may include specialized computers, servers, or other machines that are configured to individually or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze or store data from or pertaining to communications, client device operations, client rules, or user-associated actions stored at one or more data stores 235. Such data may influence communication routing to the devices within computing environment 214, how data is stored or processed within computing environment 214, among other actions.

Notably, various other devices can further be used to influence communication routing or processing between devices within computing environment 214 and with devices outside of computing environment 214. For example, as shown in FIG. 2, computing environment 214 may include a machine 240 that is a web server. Computing environment 214 can retrieve data of interest, such as client information (e.g., product information, client rules, etc.), technical product details, news, blog posts, e-mails, forum posts, electronic documents, social media posts (e.g., Twitter™ posts or Facebook™ posts), time series data, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices 204-209 may receive data periodically and in real time from a web server or other source. Devices within computing environment 214 may also perform pre-analysis on data it receives to determine if the data received should be processed as part of an ongoing project. For example, as part of a project, the computing environment 214 can perform a pre-analysis of the data. The pre-analysis can include determining whether the data is in a correct format for and, if not, reformatting the data into the correct format.

Figure 3:
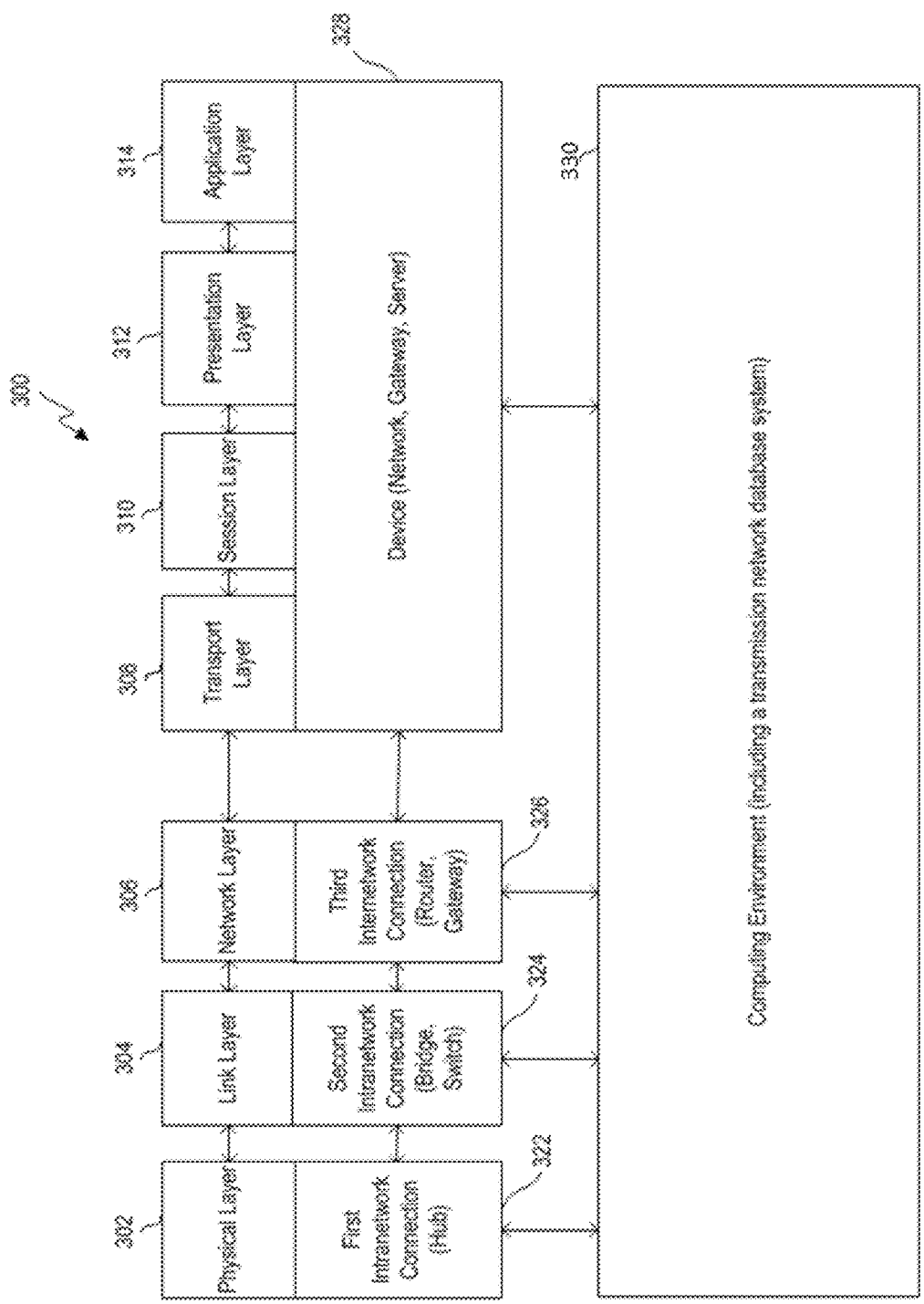
FIG. 3 is a block diagram of a model of an example of a communications protocol system according to some aspects.

FIG. 3 is a block diagram of a model of an example of a communications protocol system according to some aspects. More specifically, FIG. 3 identifies operation of a computing environment in an Open Systems Interaction model that corresponds to various connection components. The model 300 shows, for example, how a computing environment, such as computing environment (or computing environment 214 in FIG. 2) may communicate with other devices in its network, and control how communications between the computing environment and other devices are executed and under what conditions.

The model 300 can include layers 302-314. The layers 302-314 are arranged in a stack. Each layer in the stack serves the layer one level higher than it (except for the application layer, which is the highest layer), and is served by the layer one level below it (except for the physical layer 302, which is the lowest layer). The physical layer 302 is the lowest layer because it receives and transmits raw bites of data, and is the farthest layer from the user in a communications system. On the other hand, the application layer is the highest layer because it interacts directly with a software application.

As noted, the model 300 includes a physical layer 302. Physical layer 302 represents physical communication, and can define parameters of that physical communication. For example, such physical communication may come in the form of electrical, optical, or electromagnetic communications. Physical layer 302 also defines protocols that may control communications within a data transmission network.

Link layer 304 defines links and mechanisms used to transmit (e.g., move) data across a network. The link layer manages node-to-node communications, such as within a grid-computing environment. Link layer 304 can detect and correct errors (e.g., transmission errors in the physical layer 302). Link layer 304 can also include a media access control (MAC) layer and logical link control (LLC) layer.

Network layer 306 can define the protocol for routing within a network. In other words, the network layer coordinates transferring data across nodes in a same network (e.g., such as a grid-computing environment). Network layer 306 can also define the processes used to structure local addressing within the network.

Transport layer 308 can manage the transmission of data and the quality of the transmission or receipt of that data. Transport layer 308 can provide a protocol for transferring data, such as, for example, a Transmission Control Protocol (TCP). Transport layer 308 can assemble and disassemble data frames for transmission. The transport layer can also detect transmission errors occurring in the layers below it.

Session layer 310 can establish, maintain, and manage communication connections between devices on a network. In other words, the session layer controls the dialogues or nature of communications between network devices on the network. The session layer may also establish checkpointing, adjournment, termination, and restart procedures.

Presentation layer 312 can provide translation for communications between the application and network layers. In other words, this layer may encrypt, decrypt or format data based on data types known to be accepted by an application or network layer.

Application layer 314 interacts directly with software applications and end users, and manages communications between them. Application layer 314 can identify destinations, local resource states or availability or communication content or formatting using the applications.

For example, a communication link can be established between two devices on a network. One device can transmit an analog or digital representation of an electronic message that includes a data set to the other device. The other device can receive the analog or digital representation at the physical layer 302. The other device can transmit the data associated with the electronic message through the remaining layers 304-314. The application layer 314 can receive data associated with the electronic message. The application layer 314 can identify one or more applications, such as an application for managing streaming data, to which to transmit data associated with the electronic message. The application layer 314 can transmit the data to the identified application.

Intra-network connection components 322, 324 can operate in lower levels, such as physical layer 302 and link layer 304, respectively. For example, a hub can operate in the physical layer, a switch can operate in the physical layer, and a router can operate in the network layer. Inter-network connection components 326, 328 are shown to operate on higher levels, such as layers 306-314. For example, routers can operate in the network layer and network devices can operate in the transport, session, presentation, and application layers.

A computing environment 330 can interact with or operate on, in various examples, one, more, all or any of the various layers. For example, computing environment 330 can interact with a hub (e.g., via the link layer) to adjust which devices the hub communicates with. The physical layer 302 may be served by the link layer 304, so it may implement such data from the link layer 304. For example, the computing environment 330 may control which devices from which it can receive data. For example, if the computing environment 330 knows that a certain network device has turned off, broken, or otherwise become unavailable or unreliable, the computing environment 330 may instruct the hub to prevent any data from being transmitted to the computing environment 330 from that network device. Such a process may be beneficial to avoid receiving data that is inaccurate or that has been influenced by an uncontrolled environment. As another example, computing environment 330 can communicate with a bridge, switch, router or gateway and influence which device within the system (e.g., system 200) the component selects as a destination. In some examples, computing environment 330 can interact with various layers by exchanging communications with equipment operating on a particular layer by routing or modifying existing communications. In another example, such as in a grid-computing environment, a node may determine how data within the environment should be routed (e.g., which node should receive certain data) based on certain parameters or information provided by other layers within the model.

The computing environment 330 may be a part of a communications grid environment, the communications of which may be implemented as shown in the protocol of FIG. 3. For example, referring back to FIG. 2, one or more of machines 220 and 240 may be part of a communications grid-computing environment. A gridded computing environment may be employed in a distributed system with non-interactive workloads where data resides in memory on the machines, or compute nodes. In such an environment, analytic code, instead of a database management system, can control the processing performed by the nodes. Data is co-located by pre-distributing it to the grid nodes, and the analytic code on each node loads the local data into memory. Each node may be assigned a particular task, such as a portion of a processing project, or to organize or control other nodes within the grid. For example, each node may be assigned a portion of a processing task for managing streaming data.

Figure 4:
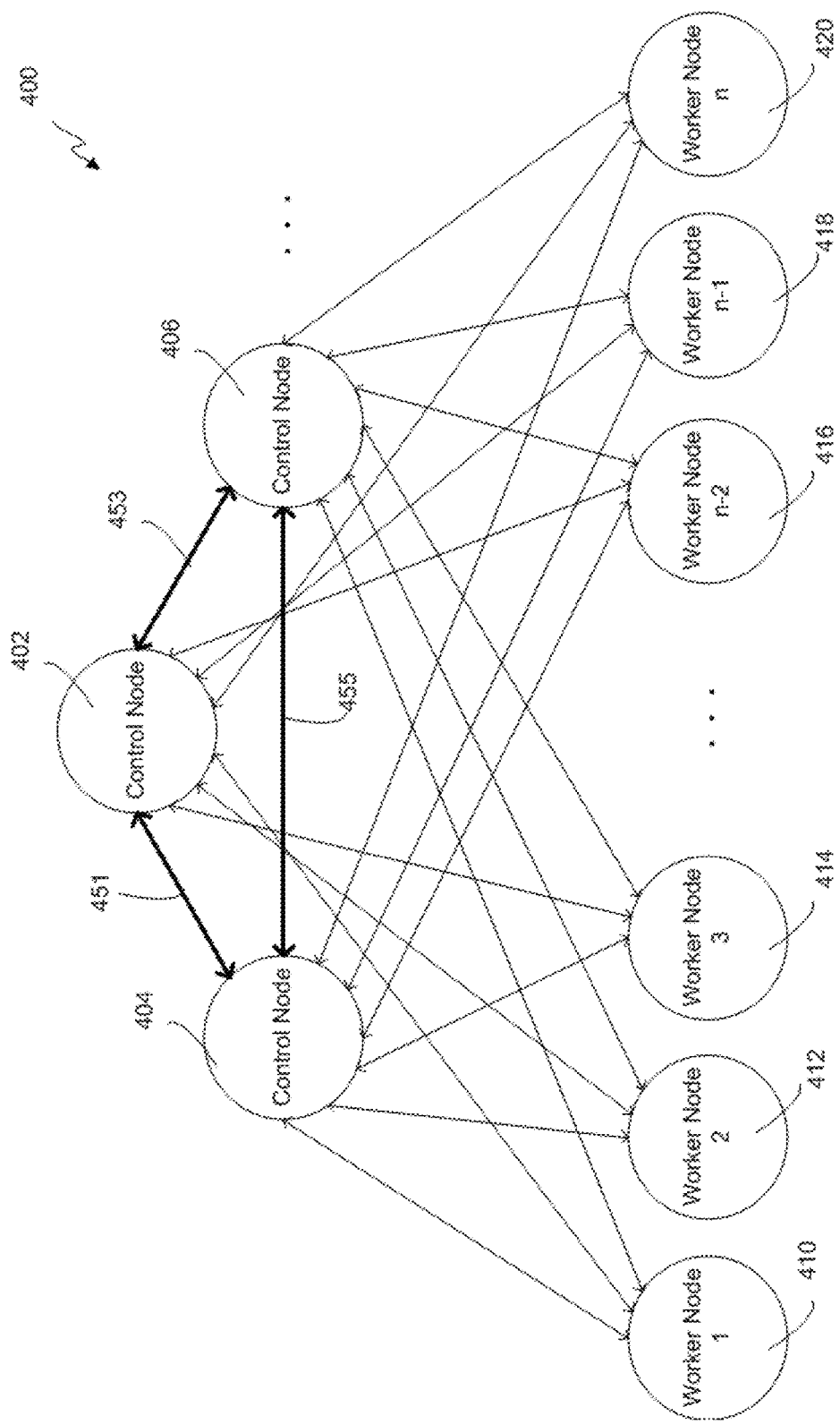
FIG. 4 is a hierarchical diagram of an example of a communications grid computing system including a variety of control and worker nodes according to some aspects.

FIG. 4 is a hierarchical diagram of an example of a communications grid computing system 400 including a variety of control and worker nodes according to some aspects. Communications grid computing system 400 includes three control nodes and one or more worker nodes. Communications grid computing system 400 includes control nodes 402, 404, and 406. The control nodes are communicatively connected via communication paths 451, 453, and 455. The control nodes 402-406 may transmit information (e.g., related to the communications grid or notifications) to and receive information from each other. Although communications grid computing system 400 is shown in FIG. 4 as including three control nodes, the communications grid may include more or less than three control nodes.

Communications grid computing system 400 (which can be referred to as a "communications grid") also includes one or more worker nodes. Shown in FIG. 4 are six worker nodes 410-420. Although FIG. 4 shows six worker nodes, a communications grid can include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid computing system 400 may be connected (wired or wirelessly, and directly or indirectly) to control nodes 402-406. Each worker node may receive information from the control nodes (e.g., an instruction to perform work on a project) and may transmit information to the control nodes (e.g., a result from work performed on a project). Furthermore, worker nodes may communicate with each other directly or indirectly. For example, worker nodes may transmit data between each other related to a job being performed or an individual task within a job being performed by that worker node. In some examples, worker nodes may not be connected (communicatively or otherwise) to certain other worker nodes. For example, a worker node 410 may only be able to communicate with a particular control node 402. The worker node 410 may be unable to communicate with other worker nodes 412-420 in the communications grid, even if the other worker nodes 412-420 are controlled by the same control node 402.

A control node 402-406 may connect with an external device with which the control node 402-406 may communicate (e.g., a communications grid user, such as a server or computer, may connect to a controller of the grid). For example, a server or computer may connect to control nodes 402-406 and may transmit a project or job to the node, such as a project or job related to managing streaming data. Once the control node 402-406 receives such a project including a data set, the control node may distribute the data set or projects related to the data set to be performed by worker nodes. Alternatively, for a project including a large data set, the data set may be received or stored by a machine other than a control node 402-406 (e.g., a Hadoop data node).

Control nodes 402-406 can maintain knowledge of the status of the nodes in the grid (e.g., grid status information), accept work requests from clients, subdivide the work across worker nodes, and coordinate the worker nodes, among other responsibilities. Worker nodes 412-420 may accept work requests from a control node 402-406 and provide the control node with results of the work performed by the worker node. A grid may be started from a single node (e.g., a machine, computer, server, etc.). This first node may be assigned or may start as the primary control node 402 that will control any additional nodes that enter the grid.

When a project is submitted for execution (e.g., by a client or a controller of the grid) it may be assigned to a set of nodes. After the nodes are assigned to a project, a data structure (e.g., a communicator) may be created. The communicator may be used by the project for information to be shared between the project code running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node 402 receives a project, the primary control node may distribute portions of the project to its worker nodes for execution. For example, a project for predicting future interest in an object can be initiated on communications grid computing system 400. A primary control node can control the work to be performed for the project in order to complete the project as requested or instructed. The primary control node may distribute work to the worker nodes 412-420 based on various factors, such as which subsets or portions of projects may be completed most efficiently and in the correct amount of time. For example, a worker node 412 may use at least a portion of data that is already local (e.g., stored on) the worker node. The primary control node also coordinates and processes the results of the work performed by each worker node 412-420 after each worker node 412-420 executes and completes its job. For example, the primary control node may receive a result from one or more worker nodes 412-420, and the primary control node may organize (e.g., collect and assemble) the results received and compile them to produce a complete result for the project received from the end user.

Any remaining control nodes, such as control nodes 404, 406, may be assigned as backup control nodes for the project. In an example, backup control nodes may not control any portion of the project. Instead, backup control nodes may serve as a backup for the primary control node and take over as primary control node if the primary control node were to fail. If a communications grid were to include only a single control node 402, and the control node 402 were to fail (e.g., the control node is shut off or breaks) then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes 402-406, including a backup control node, may be beneficial.

In some examples, the primary control node may open a pair of listening sockets to add another node or machine to the grid. A socket may be used to accept work requests from clients, and the second socket may be used to accept connections from other grid nodes. The primary control node may be provided with a list of other nodes (e.g., other machines, computers, servers, etc.) that can participate in the grid, and the role that each node can fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, the port number on which the primary control node is accepting connections from peer nodes, among others. The information may also be provided in a configuration file, transmitted over a secure shell tunnel, recovered from a configuration server, among others. While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, information about how to authenticate the node, among other information. When a node, such as the new control node, receives information about another active node, it can check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. But, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404, 406 (and, for example, to other control or worker nodes 412-420 within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes 410-420 in the communications grid, unique identifiers of the worker nodes 410-420, or their relationships with the primary control node 402) and the status of a project (including, for example, the status of each worker node's portion of the project). The snapshot may also include analysis or results received from worker nodes 410-420 in the communications grid. The backup control nodes 404, 406 may receive and store the backup data received from the primary control node 402. The backup control nodes 404, 406 may transmit a request for such a snapshot (or other information) from the primary control node 402, or the primary control node 402 may send such information periodically to the backup control nodes 404, 406.

As noted, the backup data may allow a backup control node 404, 406 to take over as primary control node if the primary control node 402 fails without requiring the communications grid to start the project over from scratch. If the primary control node 402 fails, the backup control node 404, 406 that will take over as primary control node may retrieve the most recent version of the snapshot received from the primary control node 402 and use the snapshot to continue the project from the stage of the project indicated by the backup data. This may prevent failure of the project as a whole.

A backup control node 404, 406 may use various methods to determine that the primary control node 402 has failed. In one example of such a method, the primary control node 402 may transmit (e.g., periodically) a communication to the backup control node 404, 406 that indicates that the primary control node 402 is working and has not failed, such as a heartbeat communication. The backup control node 404, 406 may determine that the primary control node 402 has failed if the backup control node has not received a heartbeat communication for a certain predetermined period of time. Alternatively, a backup control node 404, 406 may also receive a communication from the primary control node 402 itself (before it failed) or from a worker node 410-420 that the primary control node 402 has failed, for example because the primary control node 402 has failed to communicate with the worker node 410-420.

Different methods may be performed to determine which backup control node of a set of backup control nodes (e.g., backup control nodes 404, 406) can take over for failed primary control node 402 and become the new primary control node. For example, the new primary control node may be chosen based on a ranking or "hierarchy" of backup control nodes based on their unique identifiers. In an alternative example, a backup control node may be assigned to be the new primary control node by another device in the communications grid or from an external device (e.g., a system infrastructure or an end user, such as a server or computer, controlling the communications grid). In another alternative example, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative example, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed. In some examples, a communications grid computing system 400 can be used to manage streaming data.

Figure 5:
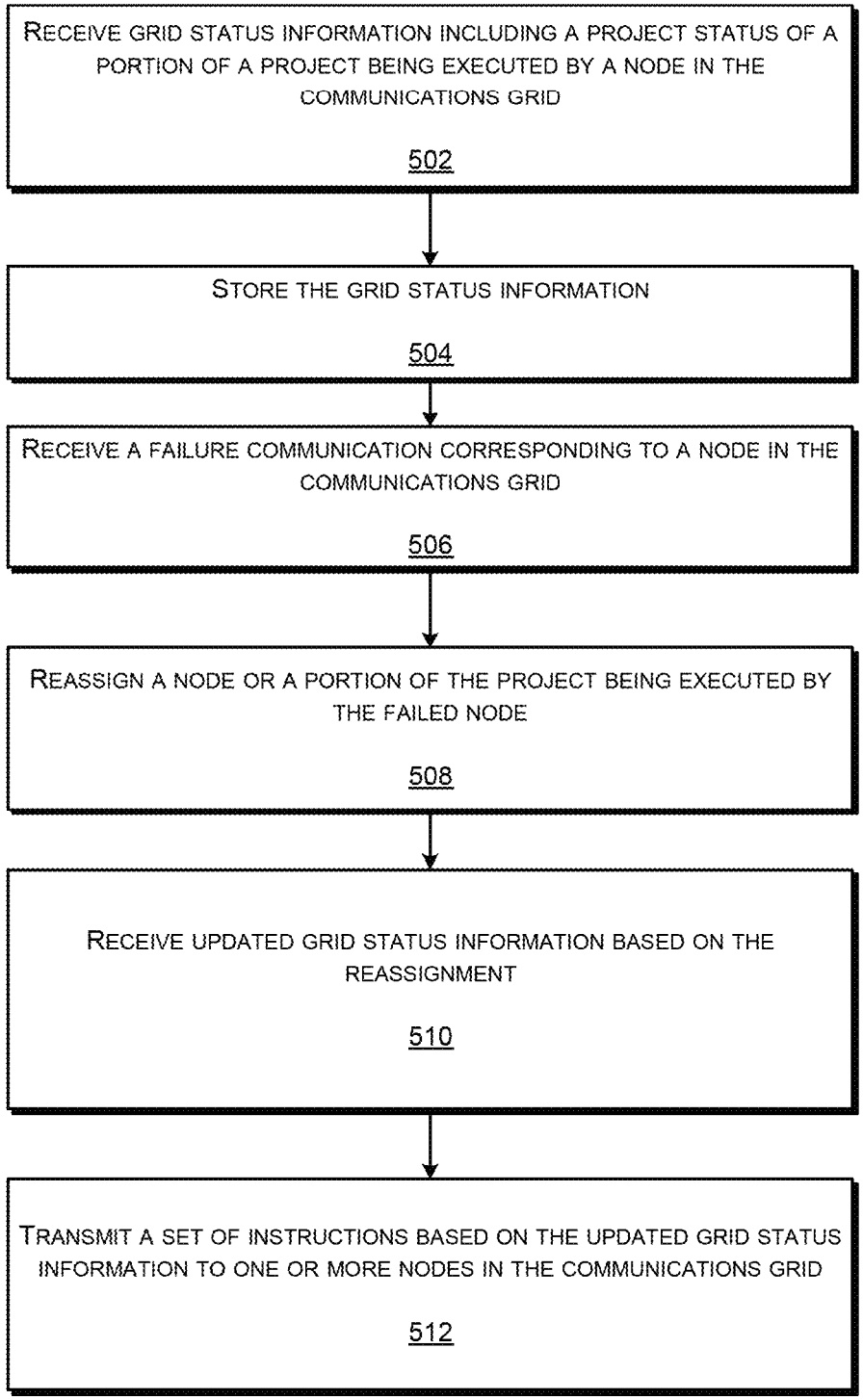
FIG. 5 is a flow chart of an example of a process for adjusting a communications grid or a work project in a communications grid after a failure of a node according to some aspects.

FIG. 5 is a flow chart of an example of a process for adjusting a communications grid or a work project in a communications grid after a failure of a node according to some aspects. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
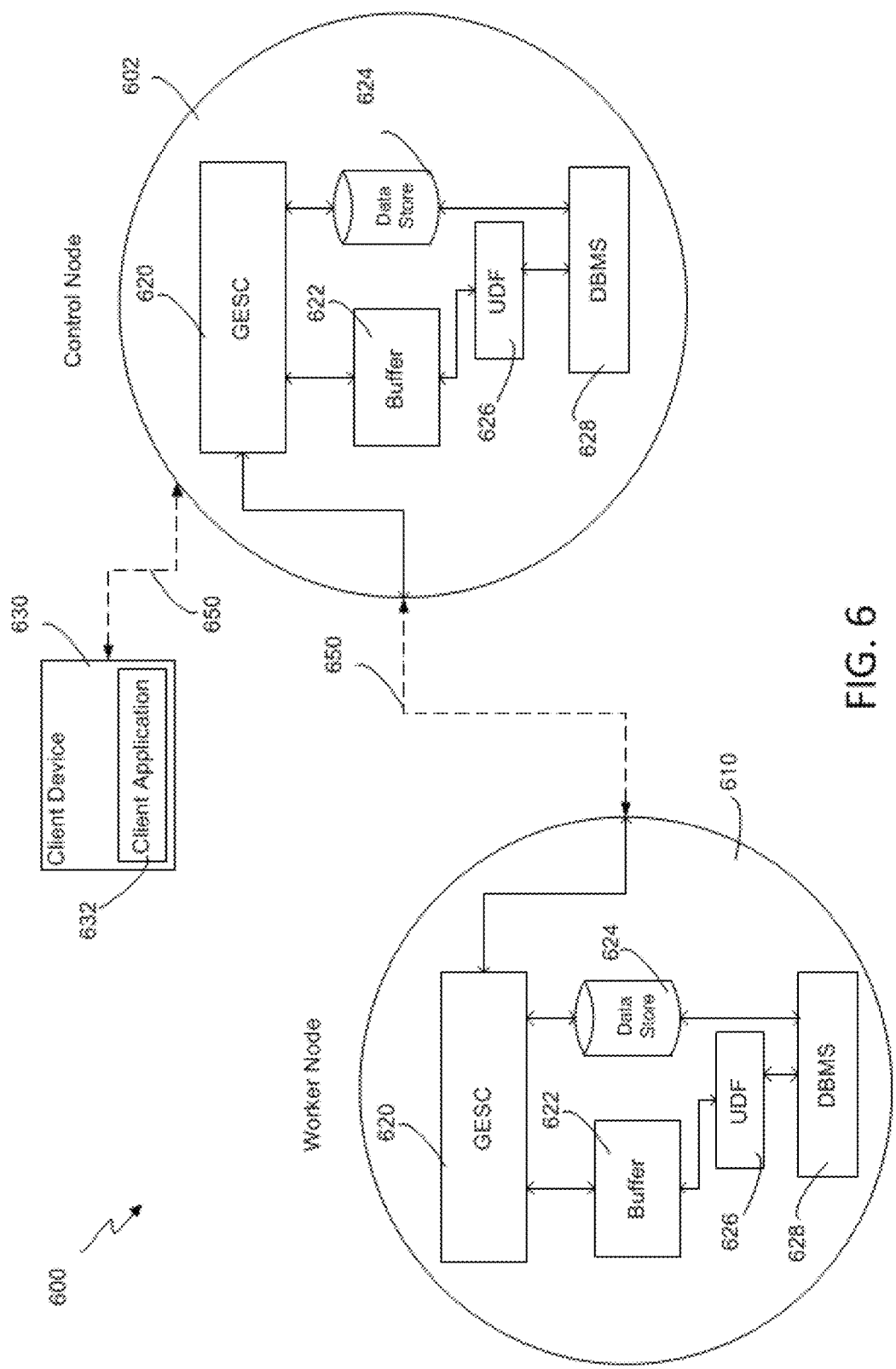
FIG. 6 is a block diagram of a portion of a communications grid computing system including a control node and a worker node according to some aspects.

FIG. 6 is a block diagram of a portion of a communications grid computing system 600 including a control node and a worker node according to some aspects. Communications grid 600 computing system includes one control node (control node 602) and one worker node (worker node 610) for purposes of illustration, but may include more worker and/or control nodes. The control node 602 is communicatively connected to worker node 610 via a communication path 650. Therefore, control node 602 may transmit information (e.g., related to the communications grid or notifications), to and receive information from worker node 610 via communication path 650.

Similar to in FIG. 4, communications grid computing system (or just "communications grid") 600 includes data processing nodes (control node 602 and worker node 610). Nodes 602 and 610 comprise multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain examples, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DMBS 628 to transfer data to or receive data from the database stored in the data stores 624 that are managed by the DBMS. For example, UDF 626 can be invoked by the DBMS to provide data to the GESC for processing. The UDF 626 may establish a socket connection (not shown) with the GESC to transfer the data. Alternatively, the UDF 626 can transfer data to the GESC by writing data to shared memory accessible by both the UDF and the GESC.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DMBS 628 may control the creation, maintenance, and use of database or data structure (not shown) within nodes 602 or 610. The database may organize data stored in data stores 624. The DMBS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
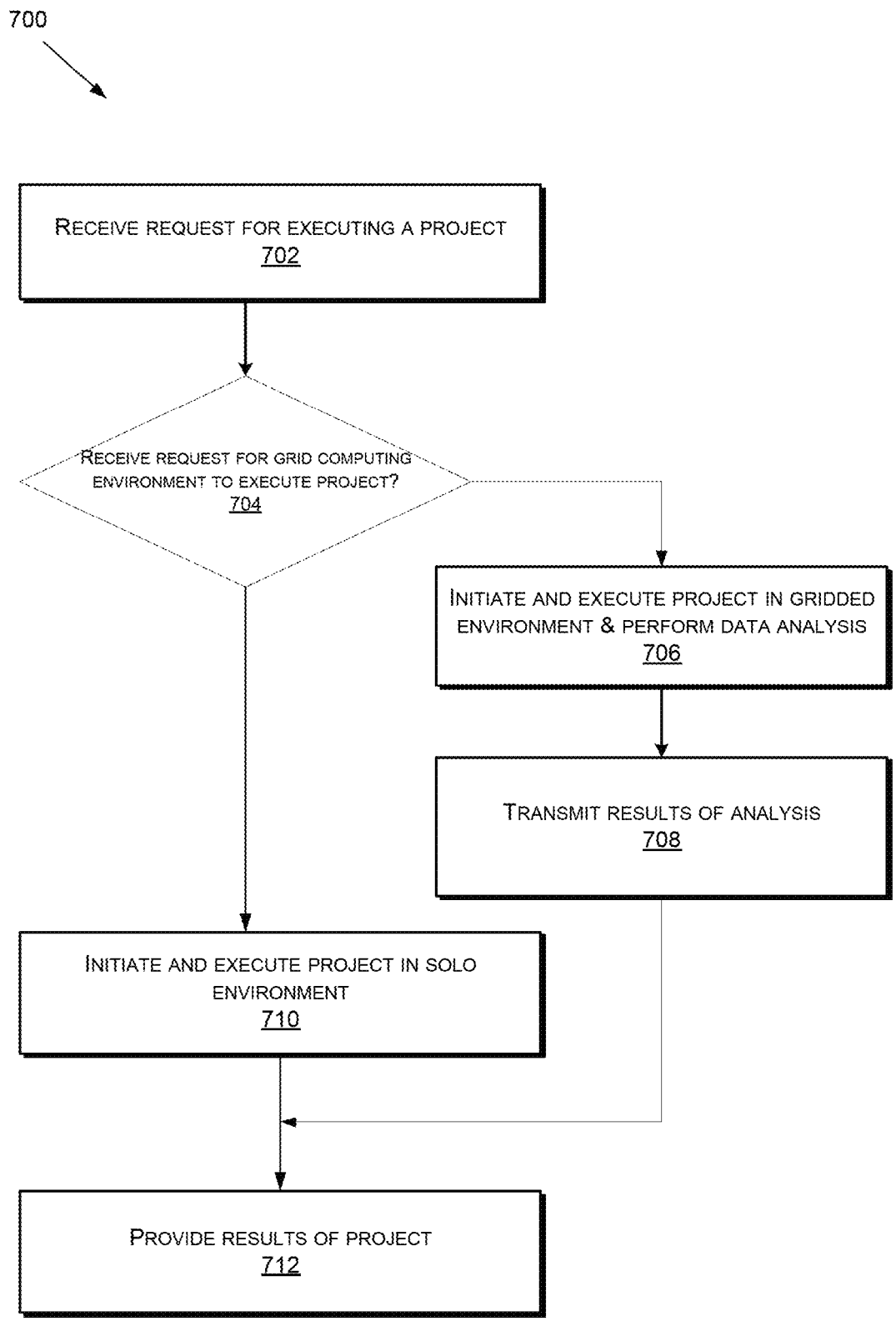
FIG. 7 is a flow chart of an example of a process for executing a data analysis or processing project according to some aspects.

FIG. 7 is a flow chart of an example of a process for executing a data analysis or a processing project according to some aspects. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024*a-c*, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

Figure 8:
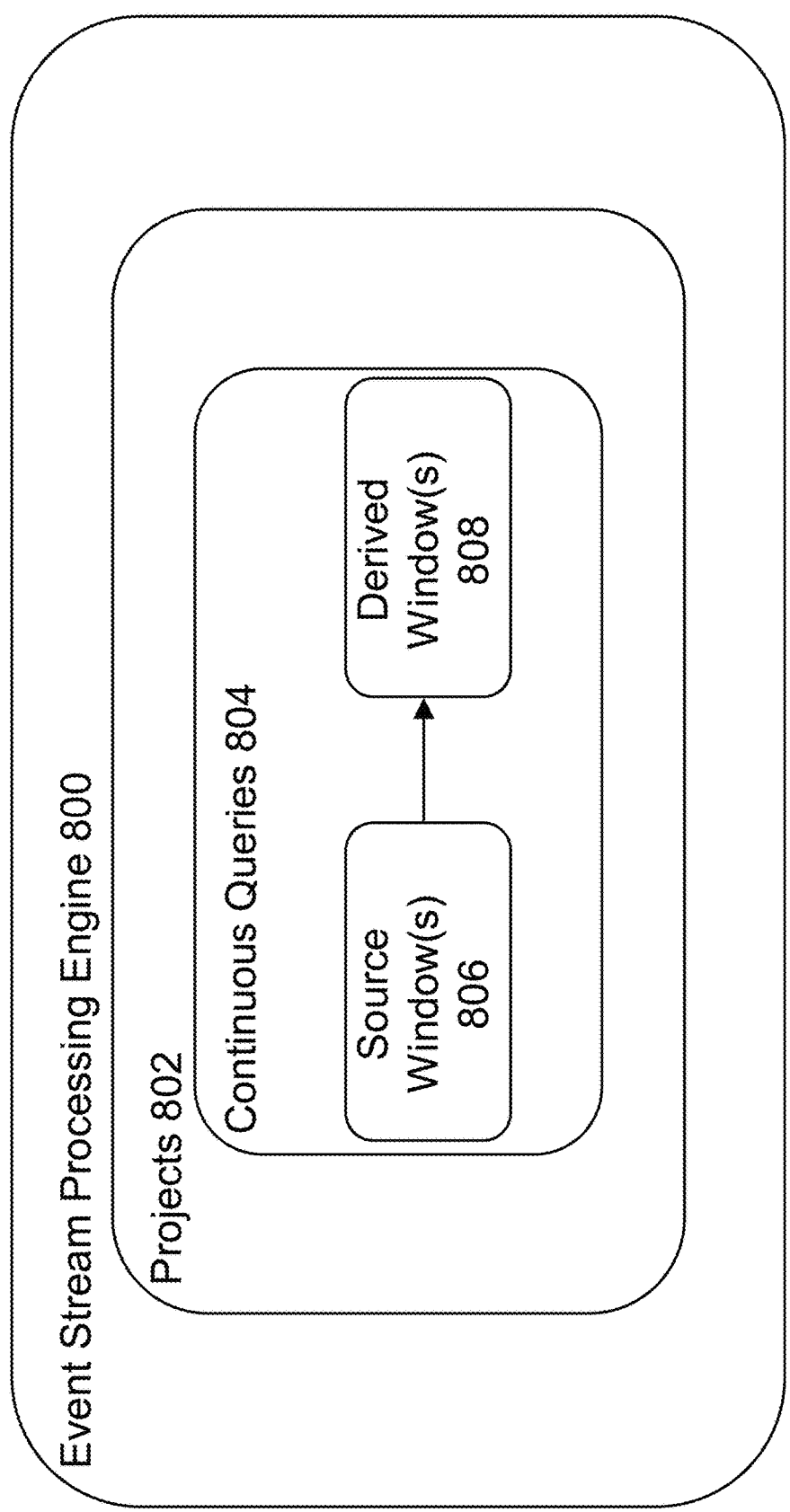
FIG. 8 is a block diagram including components of an Event Stream Processing Engine (ESPE) according to some aspects.

FIG. 8 is a block diagram including components of an Event Stream Processing Engine (ESPE) according to some aspects. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

Figure 9:
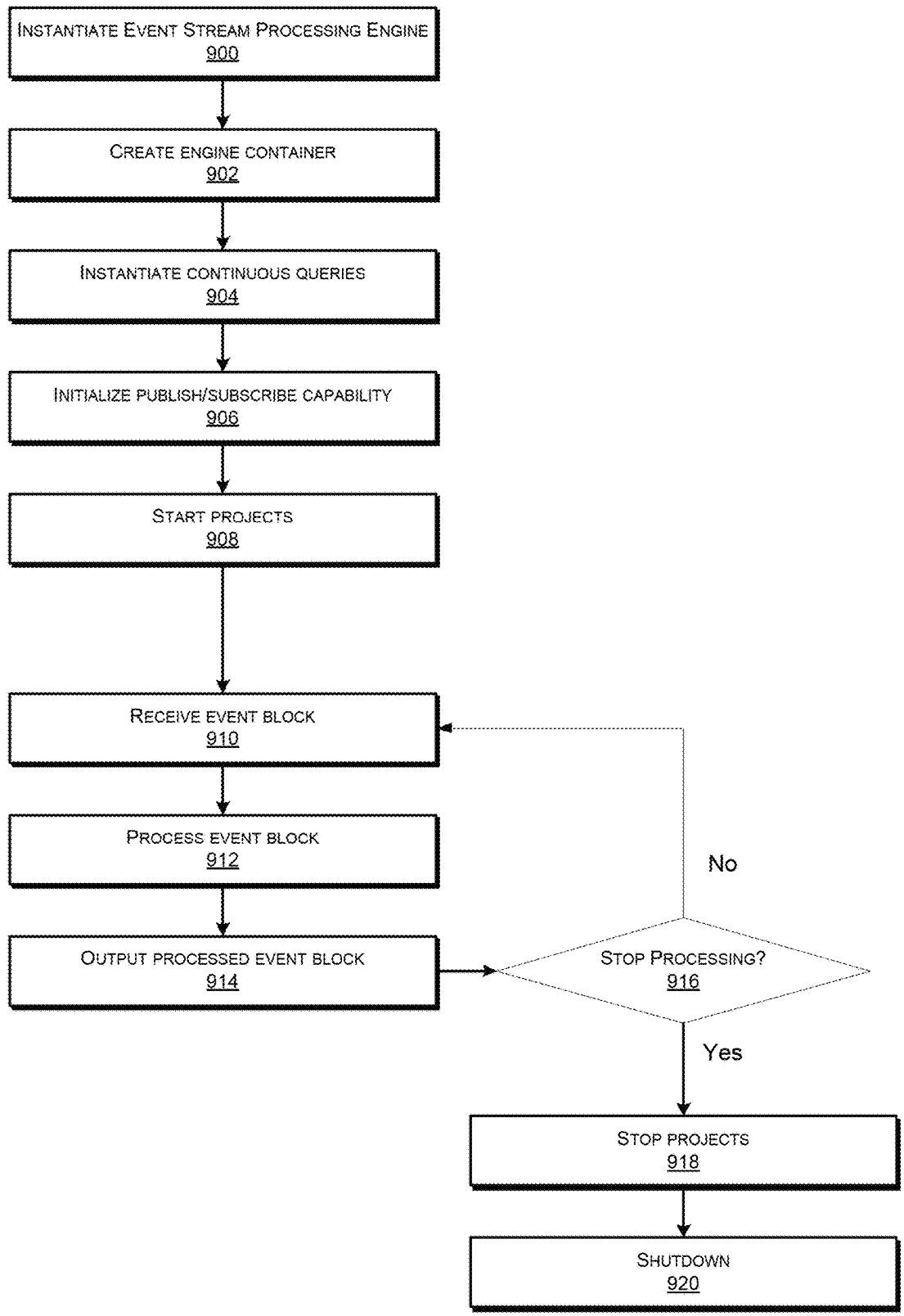
FIG. 9 is a flow chart of an example of a process including operations performed by an event stream processing engine according to some aspects.

FIG. 9 is a flow chart of an example of a process including operations performed by an event stream processing engine according to some aspects. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. Various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

Figure 10:
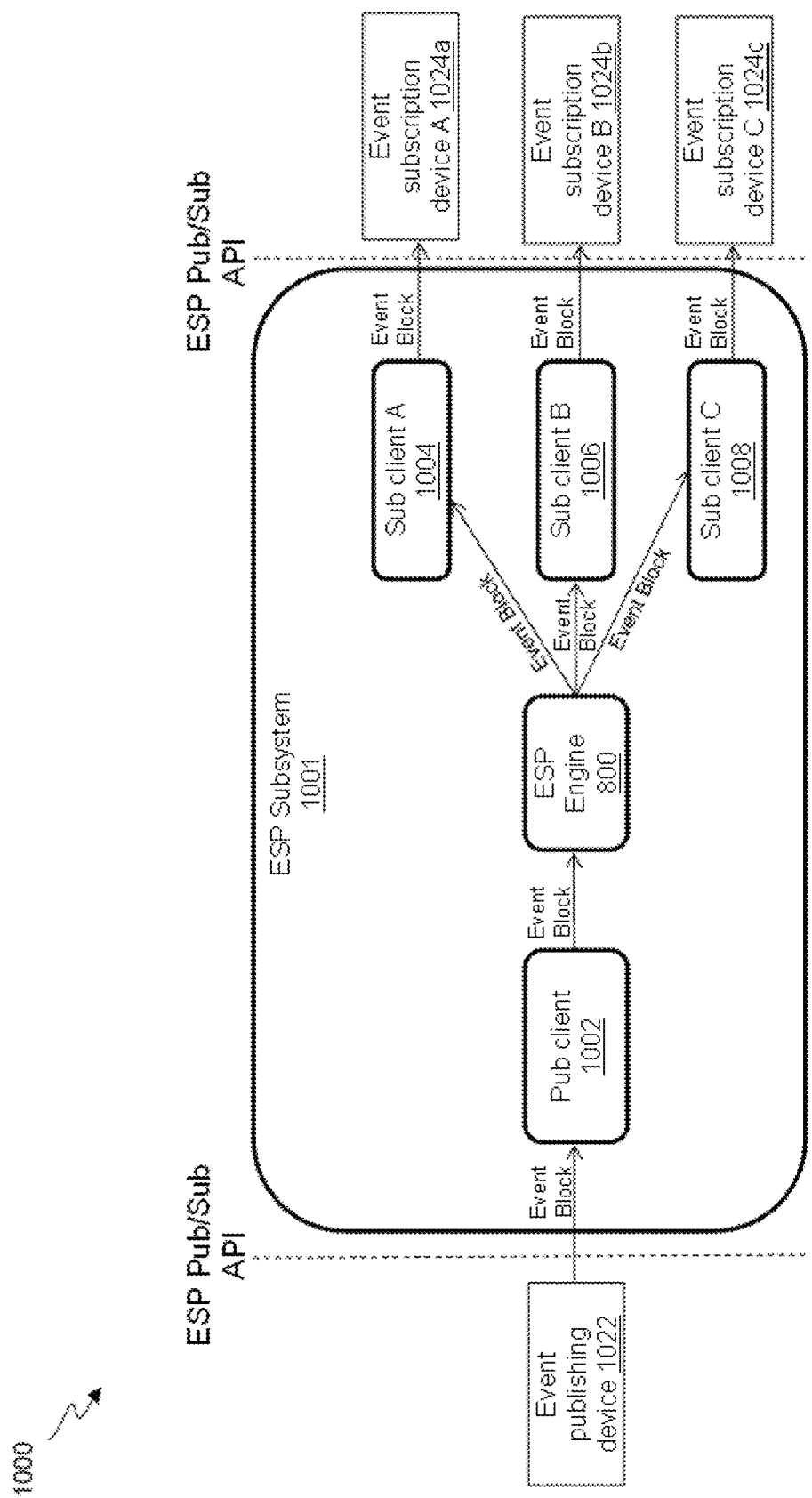
FIG. 10 is a block diagram of an ESP system interfacing between a publishing device and multiple event subscribing devices according to some aspects.

FIG. 10 is a block diagram of an ESP system 1000 interfacing between publishing device 1022 and event subscribing devices 1024a-c according to some aspects. ESP system 1000 may include ESP device or subsystem 1001, publishing device 1022, an event subscribing device A 1024a, an event subscribing device B 1024b, and an event subscribing device C 1024c. Input event streams are output to ESP device 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024a, event subscribing device B 1024b, and event subscribing device C 1024c. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024a, event subscribing device B 1024b, and event subscribing device C 1024c, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024a, event subscribing device B 1024b, and event subscribing device C 1024c.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the publishing device 1022.

ESP subsystem 800 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024a using the publish/subscribe API. Subscribing client B 1006 may be started by an event subscription application B executing at event subscribing device B 1024b using the publish/subscribe API. Subscribing client C 1008 may be started by an event subscription application C executing at event subscribing device C 1024c using the publish/subscribe API.

An event block object containing one or more event objects is injected into a source window of the one or more source windows 806 from an instance of an event publishing application on publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 806, and subscribing client C 808 and to event subscription device A 1024a, event subscription device B 1024b, and event subscription device C 1024c. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024a-c. For example, subscribing client A 804, subscribing client B 806, and subscribing client C 808 may send the received event block object to event subscription device A 1024a, event subscription device B 1024b, and event subscription device C 1024c, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some examples, big data is processed for an analytics project after the data is received and stored. In other examples, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the present disclosure provide technical solutions to technical problems, such as computing problems that arise when an ESP device fails which results in a complete service interruption and potentially significant data loss. The data loss can be catastrophic when the streamed data is supporting mission critical operations, such as those in support of an ongoing manufacturing or drilling operation. An example of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
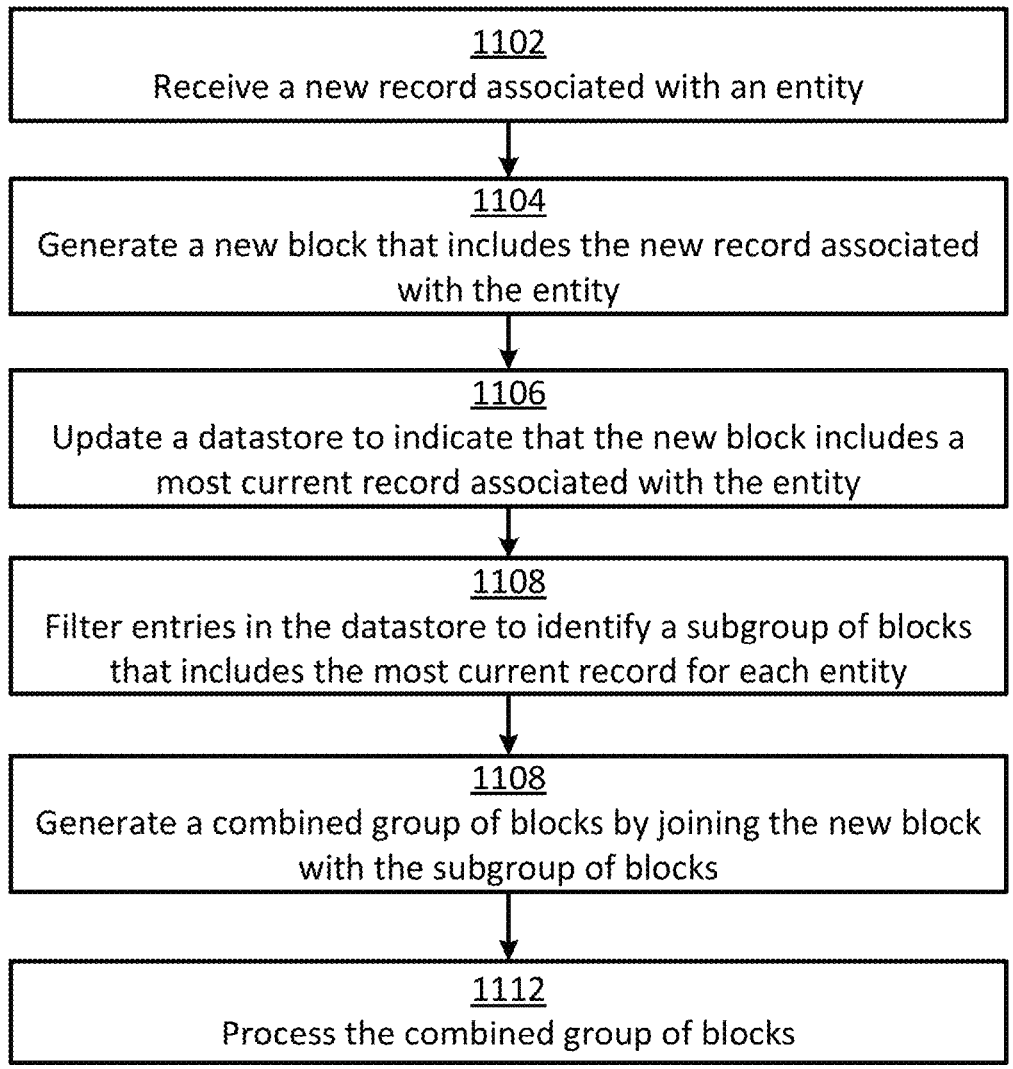
FIG. 11 is a flow chart of an example of a process for managing data according to some aspects.

FIG. 11 is a flow chart of an example of a process for managing data according to some aspects. Some examples can include more, fewer, or different steps than the steps depicted in FIG. 11. Also, some examples can implement the steps of the process in a different order. Some examples can be implemented using any of the systems and processes described with respect to FIGS. 1-10.

Although the steps below are described with reference to the processing device performing certain steps and functions, in some examples, a batch-processing engine (or another processing engine) that is executed by the processing device can perform some or all of the steps and functions.

In block 1102, a processing device receives a new record associated with an entity. For example, a computing device associated with the entity can stream (or otherwise communicate) the new record to the processing device. In some examples, the entity can include a person; a group of people; a house; a group of houses; a business; a group of businesses; a building; a group of buildings; an animal; a group of animals; an electrical device (e.g., a power device, such as a solar power device; a computing device, such as a mobile phone or server; or any combination of these); a mechanical device; or any combination of these.

The processing device can receive the new record from the entity or otherwise form the new record based on data from the entity. For example, the top half of FIG. 12 can show a first group of entities 1202 that includes House A, Business B, and Solar Unit C. The bottom half of FIG. 12 can show a second group of entities 1204 that includes House D, House E, and Gas Unit F. The groups of entities 1202, 1204 can transmit data at a particular time. For example, the first group of entities 1202 can transmit their respective power usage amounts (2.6 kilowatt hours (kWh), 125 kWh, and 14.2 kWh, respectively) to the processing device at 8:01 am on Day 1. The second group of entities 1204 can transmit their respective power usage amounts (2.9 kWh, 1.3 kWh, and 230 megawatt hours (mWh), respectively) to the processing device at 8:04 am on Day 1. The processing device can use the data transmitted by each entity as a new record.

For example, the processing device can receive a communication from House A at 8:01 am on Day 1. The communication can indicate that House A used 2.6 kWh on Day 1. The processing device can form a new record for House A that includes the amount of power used (e.g., 2.6 kWh) by House A, and the date and time (e.g., Day 1 at 8:01 AM) at which the communication was transmitted or received. As another example, the processing device can receive a communication from Gas Unit F at 8:04 am on Day 1. The communication can indicate that Gas Unit F used 230 mWh. The processing device can form a new record for Gas Unit F that includes the amount of power used (e.g., 230 mWh) by Gas Unit F, and a timestamp indicating when (e.g., 8:04 AM) the communication was transmitted or received. In some examples, the new record can include an entity associated with the new record; a date, time, or timestamp associated with the new record; and data streamed by the entity for inclusion in the new record.

The processing device can group records together into blocks 1206, 1208. For example, block 1206 can include records for the first group of entities 1202. Block 1208 can include records for the second group of entities 1204. The processing device can store the blocks as separate files on a file system. In some examples, the file system may not allow files to be updated once they have been created. For example, the file system can be part of a Hadoop environment that does not allow existing files to be updated. In some examples, the file system can have other files that include other, previously stored records. For example, various entities can communicate power usage information at daily intervals. Each day, the processing device can receive the power usage information, generate blocks that include the power usage information for the entities, and store the blocks as a new files on the file system.

In some examples, the processing device can group the records together into blocks 1206, 1208 based on a time associated with the records. For example, the processing device can group together the records for House A, Solar Unit B, and Business C because all three records are associated with the time 8:01 am. The processing device can group together the records for House D, House E, and Gas Unit F because all three records are associated with the time 8:04 am. In some examples, the processing device can group together a predetermined number of records into a block. For example, the processing device can group together 15 records (e.g., that are received sequentially) into a block. In some examples, the processing device can group together records that are transmitted or received over a predetermined time interval (e.g., one minute, 10 minutes, one hour, or one day) into a block. In some examples, the processing device can group together records that are transmitted or received during a predetermined time window (e.g., between 8:01 am and 8:03 am) into a block. The processing device can use any number and combination of techniques for grouping records together into blocks. For example, the processing device can use a hybrid approach in which it allocates records to a particular block until (i) the block includes a threshold number of records, or (ii) a predetermined time interval has passed, whichever occurs first.

In some examples, a user can to customize how the records are to be grouped together into blocks. For example, a user can provide, as input, the number of records to be included in a block. The user can select the optimal number of records to include in each block to achieve a desired balance between the number of blocks and the sizes of the blocks. For example, if fewer records are included in each block, there will need to be more blocks to account for all the records. For instance, if one record is included in each block, and there are millions of records, there will be millions of blocks to manage. Conversely, if more records are included in each block, there will be fewer blocks of larger sizes. For example, if all of the records are included in a single block, the block may have a very large size and may be difficult to update. The user can balance these issues and determine an optimal number of records to include in each block. The user can provide the optimal number as input to the processing device.

Referring back to FIG. 11, in block 1104, the processing device generates a new block that includes the new record associated with the entity. If there is already an existing block that includes another record for the entity, the processing device can generate the new block as a separate and independent block from the existing block.

Figure 12:
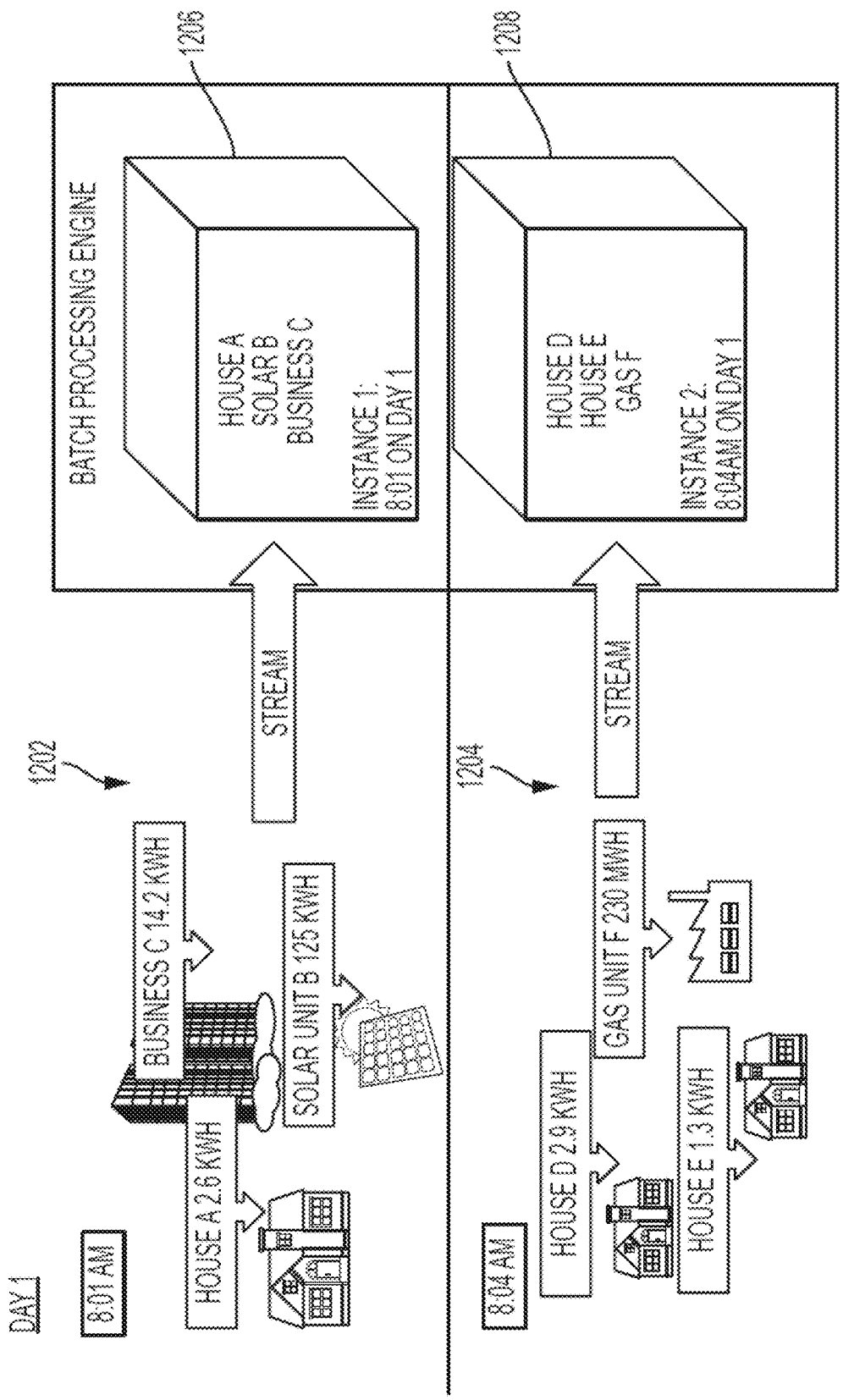
FIG. 12 is a block diagram of an example of entities transmitting data on a first day according to some aspects.
Figure 13:
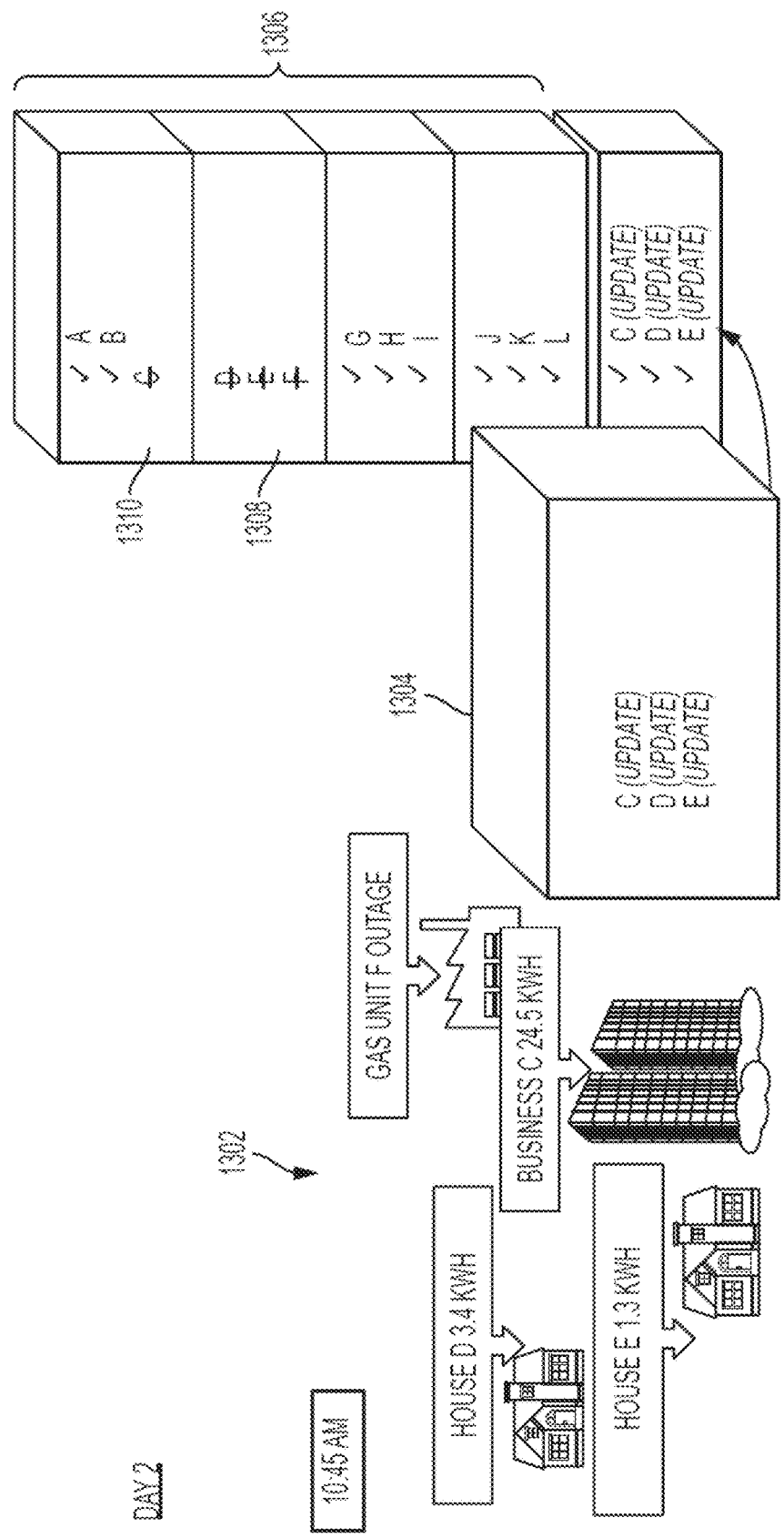
FIG. 13 is a block diagram of an example of entities transmitting data on a second day according to some aspects.

For example, the processing device can receive the power usage data shown in FIG. 12 from entities A-F on Day 1. The processing device can subsequently receive additional power-usage data from some or all of entities A-F at 10:45 am on Day 2, as shown in FIG. 13. The processing device can form a new block 1304 using the additional power-usage data (provided by the group of entities 1302). The processing device can save the new block as a new file on the file system.

In some examples, the processing device can add the new block 1304 to a stack of existing blocks 1306 associated with prior records. For example, the processing device may have loaded the stack of existing blocks 1306 associated with prior records into memory. The processing device can join, in memory, the new block 1304 to the stack of existing blocks 1306. For example, the processing device can associate the new block 1304 with the stack of existing blocks 1306 so that the processing device views the combination of the blocks as a single unit to be processed together.

In the example shown in FIG. 13, the processing device received updated power-usage information for House D, House E, and Gas Unit F on Day 2. Specifically, the processing device received an updated power-usage level for House D and House E, and an indication that Gas Unit F is experiencing a power outage. Because the processing device received updated power-usage information for all of the entities in block 1308, block 1308 no longer has the most current information for these entities. And because the processing device received updated power-usage information for House C in block 1310, block 1310 no longer has the most current information for House C. In some examples, once all of the records in a block have been updated so that the block no longer contains the most current version of any record, as is the case for block 1308 (and entities D, E, and F), it may be desirable to prevent the outdated information in the block from being used in a subsequent analysis. To prevent outdated information from being analyzed (e.g., by the processing device in subsequent steps), it may be desirable to indicate or otherwise identify which block has the most current information for each entity.

Referring back to FIG. 11, in block 1106, the processing device updates a datastore (e.g., a table, database, group of tables, group of databases, or any combination of these) to indicate that the new block includes the most current record associated with the entity. For example, the processing device can determine that the new record is the most current record for the entity based on a timestamp associated with the new record being more recent than another timestamp associated with another, existing record for the entity. The processing device can then update an existing entry in a datastore to indicate that the new block includes the most current record for the entity. Additionally or alternatively, the processing device can add a new entry to the datastore that indicates that the new block includes the most current record for the entity.

Figure 14:
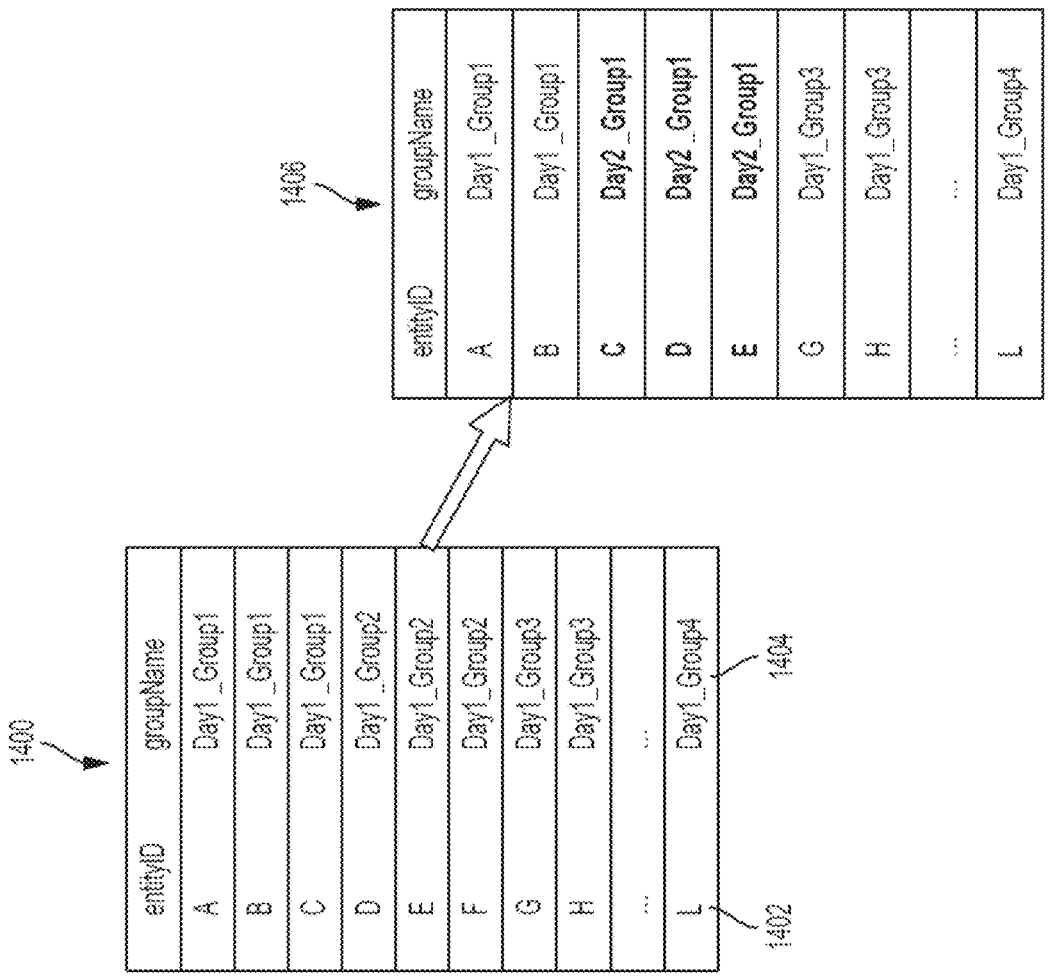
FIG. 14 is a table of an example of entities mapped to groups according to some aspects.

As a particular example, the processing device can receive the data shown in FIG. 12 on Day 1 and update a table to indicate that the most current records for entities A-C were received within particular groups or blocks on Day 1. An example of such a table is table 1400 shown in FIG. 14. The left column 1402 of table 1400 indicates an entity and the right column 1404 of table 1400 indicates a corresponding group (or block) that has the most current record associated with the entity. As shown in table 1400, as of the end of Day 1, the most current records for entities A-C are in a first group of records received on Day 1 (e.g., at 8:01 am). The most current records for entities D-F are in a second group of records received on Day 1 (e.g., at 8:04 am). Thereafter, the processing device can receive the data shown in FIG. 13 on Day 2 and update the table to indicate that the most current records for entities C, D, E, and F were received within particular groups or blocks on Day 2. An example of such an updated table may be table 1406. As shown in table 1406, the entries for entities C-E have been updated to indicate that a first group of records received on Day 2 (e.g., at 10:45 am) include the most current records. Also, the entry for entity F has been deleted because entity F is experiencing a power outage on Day 2.

Figure 15:
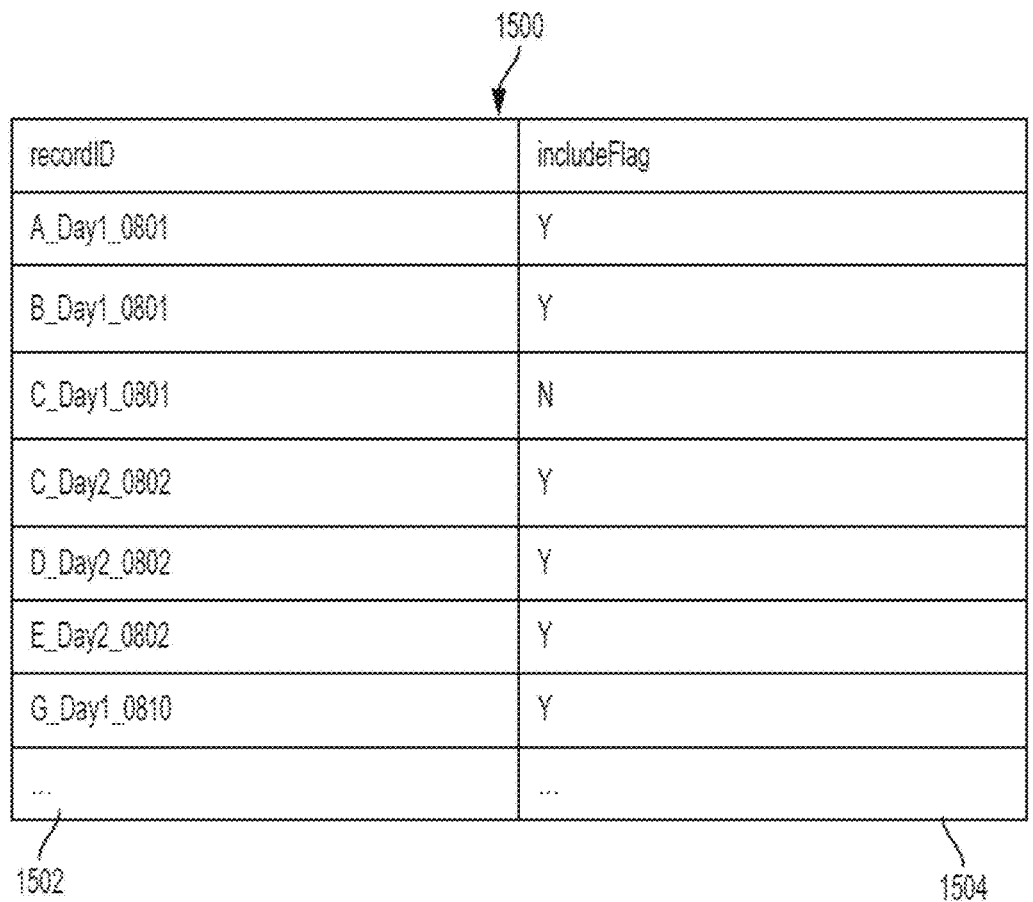
FIG. 15 is a table of an example of entities mapped to a flag according to some aspects.

As another example, the processing device can maintain the table 1500 shown in FIG. 15. The left column 1502 of the table 1500 can include information (e.g., an entity associated with a record, the day on which the record was received, and the time at which the record was received) associated with a record. The right column 1504 can include a flag indicating if the record is to be used in an analysis, if the record is the most current record, or both. In some examples, the processing device can add a new entry to the table 1500 for each new record that is received. For example, the processing device can include an entry for the record received at 8:01 am for entity C on Day 1. The processing device can also include an entry received at 10:45 am on Day 2. Because the record received on Day 2 is more current than the record received on Day 1, the processing device can set the include flag for the Day 1 record to "N" and the include flag for the Day 2 record to "Y". This can prevent outdated data from being used in a subsequent analysis, without entirely removing the outdated data, which can be advantageous (as discussed below). In other examples, the processing device can overwrite or delete entries associated with older records. For example, the processing device has deleted the older records from Day 1 for entities D and E in table 1500.

As another example, the processing device can maintain the table 1600 shown in FIG. 16. Column 1602 of table 1600 can indicate an entity associated with a record. Column 1604 can indicate a group (or block) associated with the record. Column 1606 can indicate a date and time associated with the group (or block). Column 1608 can indicate an event associated with the record. Examples of the event can include creating a first record for an entity, which can be labeled as "create" in column 1608; adding a more current record for the entity, which can be labeled as "update" in column 1608; or deleting a record for the entity, which can be labeled as "cancel" in column 1608. In some examples, the processing device can add a new entry to the table 1600 for each new record that is received. This can enable the processing device to keep a history of records for an entity over time. The history of records can enable the processing device to analyze the records as of any prior point in time. The processing device can maintain any number and combination of datastores having any number and combination of features discussed above.

Referring back to FIG. 11, in block 1108, the processing device filters entries in the datastore to identify a subgroup of blocks that includes the most current record for each entity. For example, the processing device can filter the datastore by flag, event, day, time, timestamp, group, block, or any combination of these to determine which entries have the most current records for the entities. The processing device can then determine a block associated with each of those entries. The resulting subgroup of blocks can include the most current record for each entity.

For example, the processing device can filter the table 1500 of FIG. 15 by flag to determine which entries have a flag of "Y". The entries with a flag of "Y" can have the most current records for the entities. The processor can then determine a block associated with each of those entries. The blocks associated with those entries can collectively form the subgroup of blocks. As a particular example, the processor can determine that that fourth entry in the table 1500 has the most current record for entity C by filtering the table 1500 by the flag. The processing device can then determine a specific block that has the record for entity C that was received at 8:02 am on Day 2. The processor can repeat this process to determine blocks that have the most current records for entities A-B and D-G. The processor can use those blocks as the subgroup of blocks.

As another example, the processing device can filter the table 1600 of FIG. 16 to determine which entries have (i) an event type of "Update"; (ii) the most current day and time; or both of these. The entries with the event type of "Update", the most current day and time, or both of these can have the most current records for the entities. For example, the processor can filter the table 1600 to determine that the block associated with Day1_Group1 has the most current records for entities A-B. The processor can filter the table 1600 to determine that the block associated with Day 2_Group1 has the most current records for entities C-E. The processor can filter the table 1600 to determine that entity F is canceled and is not to be used in an analysis. The processor can filter the table 1600 to determine that the block associated with Day1_Group3 has the most current records for entities G-H. Etc. The processor can include these blocks in the subgroup of blocks.

In some examples, the processing device can determine (e.g., by accessing a datastore) timestamps associated with some or all of the records for an entity. The processing device can compare the respective timestamps to one another to determine which particular record has the most current timestamp. The processing device can use the particular record as the most current record for the entity. The processing device can also determine which block the most current record is stored in, and use that block as the most current block for the entity. The processing device can repeat this process to identify which block the most current record for each entity is stored in.

Referring back to FIG. 11, in block 1110, the processing device generates a combined group of blocks by joining the new block with the subgroup of blocks. For example, the processing device can load a first set of records that are associated with the subgroup of blocks into memory. The processing device can also load a second group of records that are associated with the new block into memory. The processing device can then join together, in memory, the first group of records and the second group of records. That is, the processing device can associate the first group of records with the second group of records so that the processing device views the combination of the groups of records as a single unit to be processed together. Joining together blocks or groups of records in memory can be referred to as a virtual join.

In some examples, the processing device can create a new file that includes the first set of records that are associated with the subgroup of blocks and the second group of records that are associated with the new block. The processing device can use the new file as the combined group of blocks.

In some examples, the processing device can create a new datastore (or update an existing datastore) to include the first set of records that are associated with the subgroup of blocks and the second group of records that are associated with the new block. The processing device can use the new (or updated) datastore as the combined group of blocks. The processing device can use any number and combination of techniques to combine the new block (e.g., the records stored within the new block) with the subgroup of blocks (e.g., the records stored within the subgroup of blocks).

In block 1112, the processing device processes the combined group of blocks. The processing device can process the combined group of blocks to determine a trend, pattern, or other relationship indicated by the combined group of blocks. For example, the processing device can use the batch-processing engine to process the combined group of blocks as a batch of data. The batch-processing engine can process the combined group of blocks by concurrently analyzing some or all of the blocks in the combined group of blocks. More specifically, batch-processing engine can access memory to obtain the records associated with the combined group of blocks. The batch-processing engine can analyze the records together as a batch of data.

In some examples, the processing device can filter the combined group of blocks to identify which record (within the combined group of blocks) is the most current record for an entity. For example, the combined group of blocks can include a first block that has a first record for an entity and a second block that has a second record for the entity. The processing device can use a datastore (e.g., a table) to obtain a first timestamp associated with the first record and a second timestamp associated with the second record. The processing device can compare the first timestamp to the second timestamp to determine which record has the most current timestamp. The processing device can then use the record with the most current timestamp as the most current record for the entity. In some examples, the processing device can repeat this process for each entity to identify the most current record for each entity within the combined group of blocks. The processing device can then analyze the most current record associated with each entity.

Figure 17:
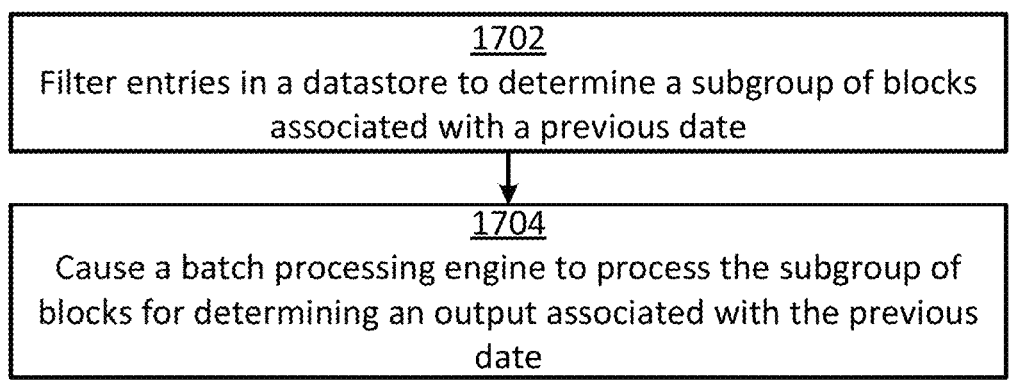
FIG. 17 is a flow chart of an example of a process for analyzing older records according to some aspects.

FIG. 17 is a flow chart of an example of a process for analyzing older records according to some aspects. Some examples can include more, fewer, or different steps than the steps depicted in FIG. 17. Also, some examples can implement the steps of the process in a different order. Some examples can be implemented using any of the systems and processes described with respect to FIGS. 1-10.

In block 1702, a processing device filters entries in a datastore to determine a subgroup of blocks associated with a previous date (e.g., a date that is at least one day prior to a current date). For example, the processing device can filter the table 1600 of FIG. 16 to determine the most current record for an entity as of the previous date. The processing device can then determine (e.g., by mapping the most current record to a corresponding block) a block that includes the most current record. The processing device can repeat this process to determine a subgroup of blocks that are associated with the most current record for each entity as of the previous date.

In block 1704, the processing device can cause a batch-processing engine to process the subgroup of blocks to determine an output that is associated with the previous date. The processing device can process the subgroup of blocks using any number and combination of the methods discussed above with respect to block 1112 of FIG. 11. In some examples, the output can include a trend indicated by the subgroup of blocks. For example, the output can include a graph that shows the cumulative energy usage by each entity as of the previous date.

Figure 18:
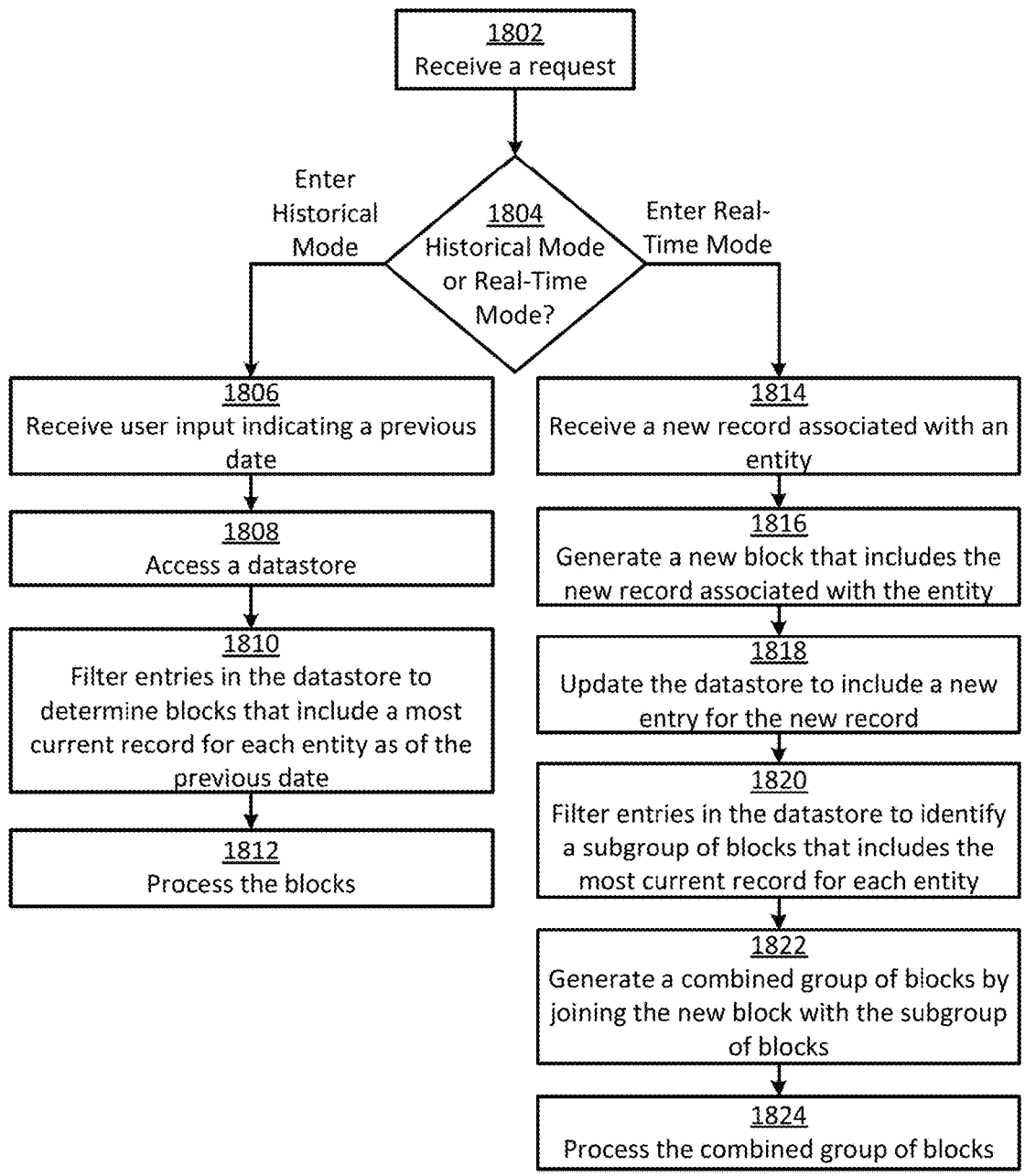
FIG. 18 is a flow chart of an example of a process for managing data according to a historical mode or a real-time mode according to some aspects.

FIG. 18 is a flow chart of an example of a process for managing data according to a historical mode or a real-time mode according to some aspects. Some examples can include more, fewer, or different steps than the steps depicted in FIG. 18. Also, some examples can implement the steps of the process in a different order. Some examples can be implemented using any of the systems and processes described with respect to FIGS. 1-10.

In block 1802, a processing device receives a request. In some examples, the request can be for causing the processing engine to operate in a real-time mode. In the real-time mode, the processing engine can analyze new records substantially simultaneously to receiving the new records. In other examples, the request can be for causing a processing engine (e.g., a batch-processing engine or another type of processing engine) to operate in a historical mode. In the historical mode, the processing engine can analyze data associated with a previous date. The previous date can be any date (e.g., a day, time, or both) prior to a current date. For example, the previous date can be at least one day prior to the current date.

In some examples, the processing device can receive the request as user input. For example, the processing device can receive a signal that is associated with the request from a touchscreen, keyboard, mouse, or other user input device. As another example, the processing device can receive the request via a user interaction with a graphical object, such as a virtual button, in a graphical user interface.

In some examples, the processing device can receive the request from a remote computing device. For example, the remote computing device can transmit the request over a network, such as the Internet. The processing device can receive the request.

In block 1804, the processing device determines if the request is for the processing engine to enter the real-time mode or the historical mode. If the request is for the processing engine is to enter the real-time mode, the process can perform the steps of blocks 1814-1824. In some examples, blocks 1814-1824 can be implemented using any number and combination of the features discussed above with respect to blocks 1102-1112 of FIG. 11. If the request is for the processing engine is to enter the historical mode, the process can continue to block 1806.

In block 1806, the processing device receives user input indicating a previous date. For example, a user may wish to have the processing engine analyze data that is a month old. The user can use a touchscreen, keyboard, mouse, or another user input device to input the previous date. The processing device can receive signals associated with the previous date via the user input device.

In block 1808, the processing device accesses a datastore. In some examples, the processing device can access the datastore via a network. For example, the processing device can transmit a query over the network to a remote server, which in turn can access the datastore and return information from the datastore.

The datastore can include multiple entries. Each entry can be associated with a particular record and include (i) the entity associated with the record, (ii) an identifier of a block that includes the record, (iii) a timestamp or other indicator of a date and time associated with the record, or (iv) any combination of these. For example, the datastore can include the table 1600 shown in FIG. 16.

In block 1810, the processing device filters entries in the datastore to determine blocks that include a most current record for each entity as of the previous date. For example, the processing device can filter the table 1600 of FIG. 16 to determine which entry in the table is associated with the most current record for an entity as of the previous date. The processing device can then determine which block is included in that entry. The processing device can repeat this process to determine the blocks that are associated with the most current record for each entity as of the previous date.

In some examples, the processing device can obtain (e.g., from the datastore) timestamps associated with some or all of the records for an entity. The processing device can compare the respective timestamps to one another to determine which particular record has the most current timestamp as of the previous date. The processing device can use the particular record as the most current record for the entity as of the previous date. The processing device can also determine which block the most current record is stored in. The processing device can then use that block as the most current block for the entity as of the previous date. In some examples, the processing device can repeat this process for each entity to identify the most current record for the entity as of the previous date, the block that has the most current record for the entity as of the previous date, or both of these.

In block 1812, the processing device processes the blocks. The processing device can process the blocks to determine a trend, pattern, or other relationship indicated by the blocks as of the previous date. For example, the processing device can use a processing engine to load into memory (or join together in memory) records that are associated with some or all of the blocks. The processing device can then use the processing engine to analyze the records to determine an output.

In some examples, the processing device can filter the blocks to identify which record (within the blocks) is the most current record for an entity as of the previous date. For example, the blocks can include multiple records for a single entity. One of the records will be the most current record for the entity as of the previous date, while the rest of the records will be outdated. The processing device can compare the timestamps associated with the records to determine which record is the most current record for the entity as of the previous date. In some examples, the processing device can repeat this process to identify the most current record as of the previous date for each entity. The processing device can then analyze the most current record (as of the previous date) associated with each entity.

Although the above-described steps and figures are provided with reference to power-usage data as an illustrative example, other examples can be performed using other types of data, such as energy data, financial data, health care data, customer intelligence data, marketing data, scientific data, or any combination of these.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

The invention claimed is:

1. A non-transitory computer readable medium comprising program code for a batch-processing engine usable to process streaming data in batches in real-time, the program code being executable by a processor for causing the processor to:
   receive a request for causing the batch-processing engine to operate in a historical mode in which the batch-processing engine analyzes a dataset in a state as of a previous date, wherein the previous date is at least one day prior to a current date, and wherein the dataset includes records previously communicated to the batch-processing engine by remote entities via a network;
   based on receiving the request, determine the state of the dataset as of the previous date by:
      accessing a database that includes a plurality of entries, each entry in the database being associated with a respective record that was previously communicated to the batch-processing engine from a respective remote entity via the network and including:
         (i) an indicator of the respective remote entity that communicated the respective record,
         (ii) a respective identifier of a file that comprises the respective record, and
         (iii) a respective timestamp indicating when the file was generated; and
      performing a filtering process that includes, for each remote entity referenced in the database, filtering entries in the database by timestamp to determine a particular file that includes a most current record for the remote entity as of the previous date by:
         receiving user input indicating the previous date;
         identifying which particular entry in the database is associated with the most current record for the remote entity as of the previous date by:
            obtaining, from the database, respective timestamps associated with a group of entries related to the remote entity; and
            comparing the respective timestamps to one another to determine that the particular entry in the group of entries has a most current timestamp as of the previous date; and
         determining that the particular file corresponds to the particular entry;
      wherein the filtering process results in a determination of a plurality of files that includes the most current record as of the previous date for each remote entity referenced in the database; and
   process the plurality of files concurrently as a batch of data to determine an output for the state of the dataset as of the previous date by:
      joining together, in memory, records that are in the plurality of files to generate a combined group of records, the combined group of records including the most current record for each remote entity referenced in the database as of the previous date; and
      processing the combined group of records to determine the output for the state of the dataset as of the previous date.

2. The non-transitory computer readable medium of claim 1, wherein at least one file in the plurality of files comprises multiple records associated with different remote entities.

3. The non-transitory computer readable medium of claim 1, wherein at least one entry in the database is associated with a record that indicates an amount of energy used or produced by a corresponding remote entity.

4. The non-transitory computer readable medium of claim 1, wherein the request is a first request, and further comprising program code that is executable by the processor for causing the processor to:
   receive a second request for causing the batch-processing engine to operate in a real-time processing mode in which the batch-processing engine analyzes new records substantially simultaneously to receiving the new records; and
   based on receiving the second request, cause the batch-processing engine to enter the real-time processing mode.

5. The non-transitory computer readable medium of claim 4, further comprising program code that is executable by the processor for causing the processor to, based on receiving the second request:
   receive, at a current time, a new record;
   generate a new file that comprises the new record; and
   update the database to include a new entry for the new record.

6. The non-transitory computer readable medium of claim 1, wherein the batch-processing engine is executable in a computing environment that does not allow for updating of existing files in a file system.

7. The non-transitory computer readable medium of claim 1, further comprising program code that is executable by the processor for causing the processor to process the combined group of records to determine the output for the state of the dataset as of the previous date by concurrently analyzing all of the records in the combined group of records to determine a trend indicated by the combined group of records as of the previous date.

8. The non-transitory computer readable medium of claim 1, further comprising program code that is executable by the processor for causing the processor to generate a graphical user interface comprising at least one graphical object that is selectable to cause the batch-processing engine to enter the historical mode or a real-time processing mode.

9. A method comprising:
   receiving, by a processor, a request for causing a batch-processing engine to operate in a historical mode in which the batch-processing engine analyzes a dataset in a state as of a previous date, wherein the previous date is at least one day prior to a current date, and wherein the dataset includes records previously communicated to the batch: processing engine by remote entities via a network;
   based on receiving the request, determining, by the processor, the state of the dataset as of the previous date by:
      accessing a database that includes a plurality of entries, each entry in the database being associated with a respective record that was previously communicated to the batch-processing engine from a respective remote entity via the network and including:
         (i) an indicator of the respective remote entity that communicated the respective record,
         (ii) a respective identifier of a file that comprises the respective record, and
         (iii) a respective timestamp indicating when the file was generated; and
      performing a filtering process that includes, for each remote entity referenced in the database, filtering entries in the database by timestamp to determine a particular file that includes a most current record for the remote entity as of the previous date by:
  receiving user input indicating the previous date;
  identifying which particular entry in the database is associated with the most current record for the remote entity as of the previous date by:
    obtaining, from the database, respective timestamps associated with a group of entries related to the remote entity; and
    comparing the respective timestamps to one another to determine that the particular entry in the group of entries has a most current timestamp as of the previous date; and
  determining that the particular file corresponds to the particular entry;
wherein the filtering process results in a determination of a plurality of files that includes the most current record as of the previous date for each remote entity referenced in the database; and
processing, by the processor, the plurality of files concurrently as a batch of data to determine an output for the state of the dataset as of the previous date by:
  joining together, in memory, records that are in the plurality of files to generate a combined group of records, the combined group of records including the most current record for each remote entity referenced in the database as of the previous date; and
  processing the combined group of records to determine the output for the state of the dataset as of the previous date.

10. The method of claim 9, wherein at least one file in the plurality of files comprises multiple records associated with different remote entities.

11. The method of claim 9, wherein at least one entry in the database is associated with a record that indicates an amount of energy used or produced by a corresponding remote entity.

12. The method of claim 9, wherein the request is a first request, and further comprising:
  receiving a second request for causing the batch-processing engine to operate in a real-time processing mode in which the batch-processing engine analyzes new records substantially simultaneously to receiving the new records; and
  based on receiving the second request, causing the batch-processing engine to enter the real-time processing mode.

13. The method of claim 12, further comprising, based on receiving the second request:
  receiving, at a current time, a new record;
  generating a new file that comprises the new record; and
  updating the database to include a new entry for the new record.

14. The method of claim 9, wherein the batch-processing engine is executable in a computing environment that does not allow for updating of existing files in a file system.

15. The method of claim 9, wherein processing the combined group of records to determine the output for the state of the dataset as of the previous date comprises concurrently analyzing all of the records in the combined group of records to determine a trend indicated by the combined group of records as of the previous date.

16. A method comprising:
  receiving, by a processor, a first request for causing a batch-processing engine to operate in a historical mode in which the batch-processing engine analyzes a dataset in a state as of a previous date, wherein the previous date is at least one day prior to a current date, and wherein the dataset includes records previously communicated to the batch-processing engine by remote entities via a network;
  based on receiving the first request, determining, by the processor, the state of the dataset as of the previous date by:
    accessing a database that includes a plurality of entries, each entry in the database being associated with a respective record that was previously communicated to the batch-processing engine from a respective remote entity via the network and including:
      (i) an indicator of the respective remote entity that communicated the respective record,
      (ii) a respective identifier of a file that comprises the respective record, and
      (iii) a respective timestamp indicating when the file was generated; and
    performing a filtering process that includes, for each remote entity referenced in the database, filtering entries in the database by timestamp to determine a particular file that includes a most current record for the remote entity as of the previous date, wherein the filtering process results in a determination of a plurality of files that includes the most current record as of the previous date for each remote entity referenced in the database;
  processing, by the processor, the plurality of files concurrently as a batch of data to determine an output for the state of the dataset as of the previous date by:
    joining together, in memory, records that are in the plurality of files to generate a combined group of records, the combined group of records including the most current record for each remote entity referenced in the database as of the previous date; and
    processing the combined group of records to determine the output for the state of the dataset as of the previous date;
  receiving, by the processor, a second request for causing the batch-processing engine to operate in a real-time processing mode in which the batch-processing engine analyzes new records substantially simultaneously to receiving the new records; and
  based on receiving the second request, causing, by the processor, the batch-processing engine to enter the real-time processing mode.

17. The method of claim 16, further comprising, based on receiving the second request:
  receiving, at a current time, a new record;
  generating a new file that comprises the new record; and
  updating the database to include a new entry for the new record.

18. The method of claim 16, wherein the batch-processing engine is executing in a computing environment that does not allow for updating of existing files in a file system.

19. The method of claim 16, wherein at least one file in the plurality of files comprises multiple records associated with different remote entities.

20. The method of claim 16, wherein at least one entry in the database is associated with a record that indicates an amount of energy used or produced by a corresponding remote entity.

21. The method of claim 16, wherein processing the combined group of records to determine the output for the state of the dataset as of the previous date comprises concurrently analyzing all of the records in the combined group of records to determine a trend indicated by the combined group of records as of the previous date.

22. A system comprising:
a processing device; and
a memory device that includes instructions for a batch-processing engine usable to process streaming data in batches in real-time, the instructions being executable by the processing device for causing the processing device to:
receive a first request for causing the batch-processing engine to operate in a historical mode in which the batch-processing engine analyzes a dataset in a state as of a previous date, wherein the previous date is at least one day prior to a current date, and wherein the dataset includes records previously communicated to the batch: processing engine by remote entities via a network;
based on receiving the first request, determine the state of the dataset as of the previous date by:
accessing a database that includes a plurality of entries, each entry in the database being associated with a respective record that was previously communicated to the batch-processing engine from a respective remote entity via the network and including:
(i) an indicator of the respective remote entity that communicated the respective record,
(ii) a respective identifier of a file that comprises the respective record, and
(iii) a respective timestamp indicating when the file was generated; and
performing a filtering process that includes, for each remote entity referenced in the database, filtering entries in the database by timestamp to determine a particular file that includes a most current record for the remote entity as of the previous date, wherein the filtering process results in a determination of a plurality of files that includes the most current record as of the previous date for each remote entity referenced in the database;
process the plurality of files concurrently as a batch of data to determine an output for the state of the dataset as of the previous date by:
joining together, in memory, records that are in the plurality of files to generate a combined group of records, the combined group of records including the most current record for each remote entity referenced in the database as of the previous date; and
processing the combined group of records to determine the output for the state of the dataset as of the previous date;
receive a second request for causing the batch-processing engine to operate in a real-time processing mode in which the batch-processing engine analyzes new records substantially simultaneously to receiving the new records; and
based on receiving the second request, cause the batch-processing engine to enter the real-time processing mode.

23. The system of claim 22, wherein the memory device further comprises instructions executable by the processing device for causing the processing device to determine the particular file that includes the most current record for the remote entity as of the previous date by:
receiving user input indicating the previous date;
identifying which particular entry in the database is associated with the most current record for the remote entity as of the previous date; and
determining the file corresponding to the particular entry.

24. The system of claim 23, wherein the memory device further comprises instructions executable by the processing device for causing the processing device to identify which particular entry in the database is associated with the most current record for the remote entity as of the previous date by:
obtaining, from the database, respective timestamps associated with a group of entries related to the remote entity; and
comparing the respective timestamps to one another to determine that the particular entry in the group of entries has a most current timestamp as of the previous date.

25. The system of claim 22, wherein at least one file in the plurality of files comprises multiple records associated with different remote entities.

26. The system of claim 22, wherein at least one entry in the database is associated with a record that indicates an amount of energy used or produced by a corresponding remote entity.

27. The system of claim 22, wherein the memory device further comprises instructions executable by the processing device for causing the processing device to, based on receiving the second request:
receive, at a current time, a new record;
generate a new file that comprises the new record; and
update the database to include a new entry for the new record.

28. The system of claim 22, wherein the batch-processing engine is executable in a computing environment that does not allow for updating of existing files in a file system.

29. The system of claim 22, wherein the memory device further comprises instructions that are executable by the processing device for causing the processing device to process the combined group of records to determine the output for the state of the dataset as of the previous date by concurrently analyzing all of the records in the combined group of records to determine a trend indicated by the combined group of records as of the previous date.

30. The system of claim 22, wherein the memory device further comprises instructions that are executable by the processing device for causing the processing device to generate a graphical user interface comprising at least one graphical object that is selectable to cause the batch-processing engine to enter the historical mode or the real-time processing mode.

* * * * *